United States Patent
Wichern et al.

(10) Patent No.: US 11,475,908 B2
(45) Date of Patent: Oct. 18, 2022

(54) SYSTEM AND METHOD FOR HIERARCHICAL AUDIO SOURCE SEPARATION

(71) Applicant: Mitsubishi Electric Research Laboratories, Inc., Cambridge, MA (US)

(72) Inventors: Gordon Wichern, Boston, MA (US); Jonathan Le Roux, Arlington, MA (US); Ethan Manilow, Chicago, IL (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 31 days.

(21) Appl. No.: 17/065,322

(22) Filed: Oct. 7, 2020

(65) Prior Publication Data

US 2022/0101869 A1    Mar. 31, 2022

Related U.S. Application Data

(60) Provisional application No. 63/085,025, filed on Sep. 29, 2020.

(51) Int. Cl.
*H04R 29/00* (2006.01)
*G10L 21/028* (2013.01)
(Continued)

(52) U.S. Cl.
CPC ............ *G10L 21/028* (2013.01); *G06F 3/165* (2013.01); *G10L 25/18* (2013.01); *G10L 25/24* (2013.01); *G10L 25/30* (2013.01); *G10L 25/51* (2013.01)

(58) Field of Classification Search
CPC ...................................................... H04R 29/00
See application file for complete search history.

(56) References Cited

U.S. PATENT DOCUMENTS

| 7,576,278 | B2 * | 8/2009 | Urata ................... G10H 1/0008 84/600 |
| 7,919,707 | B2 | 4/2011 | Harvey et al. |

(Continued)

OTHER PUBLICATIONS

Eppel., "Hierarchical semantic segmentation using modular convolutional neural networks." Computer Vision and Pattern Recognition (cs.CV). [Submitted on Oct. 14, 2017].

*Primary Examiner* — Olisa Anwah
(74) *Attorney, Agent, or Firm* — Gennadiy Vinokur; Hironori Tsukamoto

(57) ABSTRACT

The audio processing system includes a memory to store a neural network trained to process an audio mixture to output estimation of at least a subset of a set of audio sources present in the audio mixture. The audio sources are subject to hierarchical constraints enforcing a parent-children hierarchy on the set of audio sources, such that a parent audio source in includes a mixture of its one or multiple children audio sources. The subset includes a parent audio source and at least one of its children audio sources. The system further comprises a processor to process a received input audio mixture using the neural network to estimate the subset of audio sources and their mutual relationships according to the parent-children hierarchy. The system further includes an output interface configured to render the extracted audio sources and their mutual relationships.

20 Claims, 19 Drawing Sheets

(51) Int. Cl.
  *G10L 25/30* (2013.01)
  *G10L 25/24* (2013.01)
  *G10L 25/51* (2013.01)
  *G10L 25/18* (2013.01)
  *G06F 3/16* (2006.01)

(56) References Cited

U.S. PATENT DOCUMENTS

| | | |
|---|---|---|
| 2016/0071526 A1* | 3/2016 | Wingate .................. G01S 3/802 704/233 |
| 2017/0062978 A1 | 3/2017 | Seido |
| 2017/0103740 A1* | 4/2017 | Hwang ................ G06N 3/0472 |
| 2018/0047372 A1* | 2/2018 | Scallie ................ G06F 3/04815 |
| 2018/0122403 A1* | 5/2018 | Koretzky .............. G10L 21/028 |
| 2019/0341011 A1 | 11/2019 | Neuhauser et al. |
| 2020/0043518 A1* | 2/2020 | Jansson .................... G06N 3/08 |
| 2020/0293899 A1* | 9/2020 | Fernando ............... G06N 3/086 |

* cited by examiner

| Level | Instruments separated by MI networks |
|---|---|
| 3 | Keyboards, Guitars, and orchestral strings |
| 2 | Clean and effected guitars |
| 1 | Only clean guitars (electric and acoustic) |

Table 1

FIG. 4A

| Model Type | HC | Level 3 | Level 2 | Level 1 |
|---|---|---|---|---|
| SSS (Guitar) |  | 3.5 | 4.0 | 4.0 |
| SSS (Guitar) | ✓ | 3.2 | 3.6 | 3.8 |
| QBE |  | 3.2 | 2.4 | 0.2 |
| QBE | ✓ | 3.3 | 2.1 | 1.6 |

Table 2

| Model Type | Stg # | All Levels | | | Level 3 | | | Level 2 | | | Level 1 | | |
|---|---|---|---|---|---|---|---|---|---|---|---|---|---|
| | | Mix | SI-SDR | Δ | Mix | SI-SDR | Δ | Mix | SI-SDR | Δ | Mix | SI-SDR | Δ |
| SSS (Guitar) | 1 | −3.9 | −2.1 | 1.8 | 0.9 | −4.1 | 3.2 | −5.9 | −3.2 | 2.7 | −6.6 | −7.3 | −0.7 |
| SSS (Guitar) | 3 | −3.9 | 0.0 | 3.9 | 0.9 | −4.3 | 3.4 | −5.9 | −1.9 | 4.0 | −6.6 | −2.8 | 4.0 |
| QBE | 1 | −4.9 | −3.9 | 1.0 | −1.3 | −2.0 | 3.3 | −5.3 | −3.9 | 1.4 | −8.0 | −9.8 | −1.9 |
| QBE | 3 | −4.9 | −2.5 | 2.3 | −1.3 | −2.0 | 3.3 | −5.3 | −3.2 | 2.1 | −8.0 | −6.4 | 1.6 |

FIG. 4D

| | Data Reduction | | Levels | | | |
|---|---|---|---|---|---|---|
| | type | % | All | Level 3 | Level 2 | Level 1 |
| SSS (Guitar) | − | 0 | 3.8 | 3.5 | 4.0 | 4.0 |
| | all | 50 | 3.3 | 3.1 | 3.4 | 3.4 |
| | leaf | 50 | 3.5 | 3.3 | 3.6 | 3.6 |
| | all | 90 | 0.1 | 1.5 | −0.7 | −0.5 |
| | leaf | 90 | 3.6 | 3.4 | 3.7 | 3.7 |
| | Mix | | −3.9 | 0.9 | −5.0 | −6.6 |
| QBE | − | 0 | 2.3 | 3.3 | 2.1 | 1.6 |
| | all | 50 | −1.5 | −2.1 | −1.4 | −1.1 |
| | leaf | 50 | 2.2 | 3.4 | 2.1 | 1.1 |
| | all | 90 | −1.8 | −2.1 | −1.8 | −1.5 |
| | leaf | 90 | 1.9 | 3.1 | 1.7 | 0.8 |
| | Mix | | −4.9 | −1.3 | −5.3 | −8.0 |

Table 4

SYSTEM AND METHOD FOR HIERARCHICAL AUDIO SOURCE SEPARATION

TECHNICAL FIELD

The present disclosure generally relates to audio processing and more particularly to a system and a method for hierarchical audio source separation.

BACKGROUND

The field of source separation has seen notable performance improvements with the introduction of deep learning techniques, most notably in the areas of speech enhancement, speech separation, and music separation. These techniques succeed in cases where the notion of a source is well defined; in the case of speech enhancement or separation, the target is always defined as the speech of a single speaker. However, real-world scenarios can have more complicated definitions of a source because in the real-world scenarios multiple audio sources, which may not always be well-defined, are required to be considered for audio source separation.

For example, in the music separation task, determining what constitutes a target source is not well defined. Even in a well-studied problem like singing voice separation, in which the singer is isolated from non-vocal background music, the definition of what is "singing voice" is somewhat muddled. Many popular songs often contain a lead vocal part, possibly several additional background vocal parts, and sometimes additional vocal effect tracks. This is a simple case, and when instrument categories with a larger variety of possible timbres are considered, like synthesizers or guitars, deciding what particular instrument part to isolate can become even harder to determine One may want to go even further and separate each instrument into unique notes or chord instances.

Currently, audio source separation systems may separate audio sources present in a given audio mixture according to a single notion of what constitutes a source. However, in a number of applications, such a specific audio separation is not sufficient.

SUMMARY

It is an objective of some embodiments to achieve sound separation of audio sources in an audio mixture. Additionally, or alternatively, it is an object of some embodiments to separation of audio sources at multiple levels of granularity. Additionally, or alternatively, it is an object of some embodiments to determine a mutual relationship of audio sources included in an audio mixture. For example, it is an objective of some embodiments to estimate multiple audio sources within an auditory scene and simultaneously define mutual relationship between the estimated multiple audio sources. Additionally, or alternatively, it is an object of some embodiments to provide a neural network trained to achieve these two objectives, i.e., extract, from an audio mixture, different audio sources included in the audio mixture and provide mutual relationship among the extracted audio sources.

Some embodiments are based on recognition that classification of extracted sound sources is beneficial for a number of applications. However, the classification can be not only absolute, but a relative one, and in a number of practical applications the relative classification can complement or be equally important as the absolute classification. For example, for some applications classifying a sound as originated from a guitar can be as important as classifying this sound as generated with principles of originations similar to a violin. However, there are infinite numbers of different ways to define mutual relationships and not all of these mutual relationships can be used to train a neural network.

Some embodiments are based on recognition that many sounds that humans encounter are hierarchical in nature. For example, a hi-hat note is one of many such hi-hat notes, which is one of several parts of a drumkit, itself one of many instruments in a band, which might be playing in a bar with other sounds occurring. Accordingly, a source separation problem may be re-framed as hierarchical, combining similar sound sources together at certain levels and separating them at other levels. Re-framing the source separation problem as hierarchical allows users to deconstruct the same mixture in multiple ways depending on an appropriate level of the hierarchy for a given application.

Notably, the hierarchical classification of sources provides a natural and intuitive way to define mutual relationships among them. Indeed, the mutual relationship between any two audio sources belonging to the same hierarchical ontology can be defined by the shortest path connecting them in a graph representing that hierarchical ontology. In addition, the hierarchical relationship between different audio sources can be defined in a manner suitable for training a neural network for joint extraction and mutual classification. For example, some embodiments are based on recognition that the relationship between the estimated multiple audio sources may be defined in the form of a hierarchical structure of audio sources based on audio properties. The audio properties to be used to define the hierarchy may depend on the application. For example, different harmonic structures may be used to determine hierarchy of musical instruments.

To that end, some embodiments train a neural network to extract multiple audio sources from an audio mixture subject to hierarchical constraints on ontology of audio properties enforcing a parent-children hierarchy of the extracted audio sources. As used herein, the hierarchical constraints on ontology of audio properties enforce that a set of audio properties of a parent audio source in the parent-children hierarchy includes sets of audio properties of its children. Thus, the set of audio properties of the parents are such that for each audio property its set of attributes is the union of the set of attributes of the children for that audio property, where the set of attributes is the set of values that the audio property can take. For example, electric and acoustic are attributes of the property of sound production. The audio properties can vary for different applications. Examples of audio properties include one or combination of the physical properties that produce the sound, signal characteristics (e.g., whether a sound has a harmonic frequency structure), or contextual information indicating the co-occurrence of sounds.

Defining hierarchical ontology using hierarchical constraints on audio properties allows ensuring satisfaction of these constraints during training of the neural network. Indeed, the hierarchical constraints represented as inclusion of audio properties of a child into audio properties of a parent can be defined mathematically in a differentiable manner and thus used during training via back-propagation. In such a manner, the neural network trained to extract audio source subject to hierarchical constraints can perform two desired tasks simultaneously.

In addition, some embodiments are based on surprise observation that training a neural network for dual objectives with hierarchical constraints on audio properties has additional technical benefits. For example, such a training may require less training data to achieve the source separation of the dual objectives that would be required for training a neural network having only one source separation objective. In addition, training a neural network for multi-level source separation achieves synergy in quality of performance for the separation task at each level. Some embodiments are based on intuition that such a synergy is achieved due to reusability of the same training data samples for different levels of the hierarchical ontology. That is a training data sample used to train a particular level of the ontology indirectly participates in the training of shared parameters that also impact separation at other levels of the ontology.

In some exemplar embodiments, a process of hierarchical musical instrument separation is based on separating specific instruments (like guitars). In some additional or alternative embodiments, the process of hierarchical musical instrument separation is based on determination of what to separate in accordance with a user-supplied audio example. In some embodiments, the process of hierarchical musical instrument separation is based on separation of all hierarchy levels even when training data is limited at fine-grained levels of the hierarchy. Notably, the musical instrument separation example is provided for clarity and is not intended to limit the scope of different embodiments. Various embodiments are applicable to different kinds of audio mixtures, audio sources separation and mutual classification.

Some embodiments are based on the realization, that separated audio sources from the given audio mixture can be arranged in a hierarchical order of sound producing objects, where top levels of the hierarchy correspond to broad groups (e.g., midrange stringed instruments) and lower levels are more specific (e.g., acoustic guitar). With regard to source separation, an auditory hierarchy may be defined such that sources at higher levels in the hierarchy are composed of mixtures of sources at lower levels of the hierarchy. Each source node can potentially be further separated into child sources and combined with its siblings to create parent sources.

Some embodiments are based on the recognition that a source-specific separation (SSS) network may be implemented, in a single network, to estimate multiple sources from a given auditory mix. The mask inference networks attempt to estimate a real-valued mask M for a single target source c by minimizing some distortion measure between the source estimate obtained from the mask and a reference spectrogram. To that end, in some embodiments, the SSS network uses a truncated phase sensitive approximation (tPSA). The SSS network outputs a set of masks (for example, N masks), one for each target source.

Accordingly, in some embodiments the multiple sources are arranged in the hierarchical order. To that end some embodiments implement a multi-level strategy in which a network is trained to output multiple levels of the hierarchy at once. For example, a single network may output N masks, one for each of N levels of a hierarchy. This allows for jointly training layers of the network and training a network for a whole path down the hierarchy (for example, [strings/keys]→[guitars]→[clean guitars]). Thus, the single network may be able to leverage learned knowledge about a mask to reinforce and improve its estimate for another mask along the hierarchy.

Some embodiments are based on the realization that by only using SSS networks for hierarchical source separation, it may not be possible to capture many instruments in an instrument hierarchy. In order to capture relationship between different instruments in a hierarchy, separation of multiple instruments at different levels with a single network may be required. To that end, a hierarchical audio separation algorithm may be used that employs a query-by-example (QBE) network. The QBE network takes as inputs a mixture and an example of a desired source to separate from the mixture. By extending this to a hierarchical case, an entire source of audio (for example, instruments) hierarchy for source separation can be modelled. Alternatively, instead of conditioning on a query, we can condition the separation on the leaf node label, leading to a hierarchical extension of a conditional source separation method. In some embodiments, the hierarchical QBE comprises two networks: a query net that calculates a query anchor $A_q$ for some input query Q, and a masking net that takes as input the mixture and the query anchor $A_q$ and produces a mask M for a target source which is in the same node of the hierarchy as the query Q.

Some embodiments are based on the realization that the hierarchical QBE system may be trained to minimize truncated phase sensitive approximation (tPSA) objective function based on the target source, where the target source used to train the network is determined both by the query and a given level in the hierarchy. The audio samples used for training and validation may depend on the type of sounds to be separated hierarchically. For example, for hierarchical separation of musical instruments the network may be trained on audio samples of different musical instruments such as guitars, pianos, or the likes.

Some embodiments are based on an understanding that the components of a mixture exist in some hierarchy, thus knowledge about the structure of the mixture can be leveraged to impart constraints on the network. For instance, the relationship between different musical instruments may be predefined in terms of a hierarchical order of the musical instruments. In one embodiment, this relationship captured such that a set of masks produced by a multi-level hierarchical network for audio separation follows the same structure as the hierarchy, namely that masks at higher levels be composed of masks at lower levels. However, this may result in a situation that the network would output masks for every node in the hierarchy, which may be infeasible for a sufficiently realistic hierarchy. Therefore, a hierarchical constraint that does not require an output for every node in hierarchy can be imposed. In some embodiments, this hierarchical constraint requires that masks at higher levels in the hierarchy must apportion at least the same amount of energy as masks at lower levels. As a result, the parent audio source in the hierarchy is a mixture of its children audio sources.

Accordingly, one embodiment discloses an audio processing system. The audio processing system includes a memory configured to store a neural network trained to process an audio mixture to output estimation of at least a subset of a set of audio sources present in the audio mixture, wherein the audio sources are subject to hierarchical constraints enforcing a parent-children hierarchy on the set of audio sources, such that a parent audio source in the parent-children hierarchy includes a mixture of its one or multiple children audio sources, and wherein the subset includes at least one parent audio source and at least one of its children audio sources; an input interface configured to receive an input audio mixture; a processor configured to process the input audio mixture using the neural network to extract estimates of the subset of audio sources and their mutual relationships according to the parent-children hierarchy; and an output interface configured to render the extracted audio sources and their mutual relationships.

Another embodiment discloses an audio processing method, wherein the method uses a processor coupled to a memory storing a neural network trained to process an audio mixture to output estimation of at least a subset of a set of audio sources present in the audio mixture, wherein the audio sources are subject to hierarchical constraints enforcing a parent-children hierarchy on the set of audio sources, such that a parent audio source in the parent-children hierarchy includes a mixture of its one or multiple children audio sources, and wherein the subset includes at least one parent audio source and at least one of its children audio source, wherein the processor is coupled with stored instructions implementing the method, wherein the instructions, when executed by the processor carry out steps of the method, including receiving an input audio mixture; processing the input audio mixture using the neural network to extract estimates of the subset of audio sources and their mutual relationships according to the parent-children hierarchy; and rendering the extracted audio sources and their mutual relationships.

Definitions

As used herein, an audio property is a set of attributes describing sound signals. Sound signals with common attributes for a given property can be grouped together. Examples of audio properties include: signal characteristics such as frequency content with attributes such as high frequency dominant, mid-range dominant, harmonic frequency structure, etc., physical mechanisms that produce sound with attributes such as string instrument, acoustic, electric, etc., or contextual information indicating where sounds typically occur such as indoors, outdoors, etc.

As used herein, an audio hierarchy is a group of audio sources with a parent child relationship, where the properties of the parents are such that for each property, its set of attributes is the union of the set of attributes of the children for that property, where the set of attributes is the set of values that the property can take.

As used herein, an audio source is an audio signal composed of the vibrations from one or more sound producing objects which can be meaningfully grouped together for a given application. Examples of audio sources could be a single string on a guitar, the entire guitar, or all guitars playing in a song.

As used herein, an audio mixture is an audio signal composed of the vibrations from multiple sound producing objects, where some of those objects may not be relevant for a given task.

As used herein, audio separation is the process of extracting the signal(s) of one or more audio sources from and an audio mixture.

As used herein, a mask is a non-linear time-frequency filter estimated from the audio mixture, e.g., by a neural network, and used by an audio separation system to extract audio sources from an audio mixture. Typically, the mask estimates a probability that a source is present in each time frequency bin of the spectrogram.

As used herein, hierarchical constraints enforce a parent-children hierarchy on the audio sources, such that a parent audio source in the parent-children hierarchy includes its one or multiple children audio sources. The hierarchical constraints can be enforced during the source separation, training of the neural network performing the separation, or both. The separated audio sources are related to nodes in the parent-children hierarchy. In such a manner, the extracted audio sources are mutually related to each other according to the hierarchy. Notably, while the parent-children hierarchy is defined in advance for a set of audio sources, during the audio source extraction, only estimation of a subset of audio sources of an interest that are present in the audio mixture is extracted.

There are a number of ways how to enforce such relationship, and therefore, the hierarchical constraints vary among different embodiments. The hierarchical constraints can enforce the parent-children hierarchy directly, indirectly, or in combination thereof. Examples of direct enforcement of hierarchical constraints include defining the hierarchy of audio sources as leaf audio sources corresponding to leaf nodes of the hierarchy and non-leaf audio sources corresponding to non-leaf nodes of the hierarchy and directly matching the outputs of audio separation to one of the nodes. For example, one embodiment separates only leaf audio sources and forms the non-leaf audio sources by combining their children leaf audio sources. In such a manner, the parent audio sources are guaranteed to be mixtures of their children. Additionally, or alternatively, one embodiment separates a sequence of audio sources according to a path in the parent-children hierarchy such that each subsequent audio source includes all previous audio sources.

Examples of indirect enforcement of hierarchical constraints include enforcing relationships of energy and/or values of the audio properties of audio sources according to the parent-children hierarchy. For example, one embodiment estimates masks that when applied to the audio mixture extracts corresponding audio sources. In this embodiment, the hierarchical constraints enforce that energy of a mask corresponding to a parent audio source is not less than energy of a mask corresponding to any of its children audio sources. Additionally, or alternatively, one embodiment ensures that values of the audio properties of the parent node include values of the corresponding audio properties of its children. For example, in some implementations, audio properties of the parents are such that for each property, its set of attributes is the union of the set of attributes of the children for that property, where the set of attributes is the set of values that the property can take.

In some embodiments, the hierarchical constraints are enforced on training data used to train the network, wherein the network is trained to estimate at least a parent audio source and at least one of its children audio sources, and the ground truth training data for the parent audio source is such that it is the mixture of the ground truth training data for its children audio sources.

BRIEF DESCRIPTION OF THE DRAWINGS

FIG. 4A shows Table 1 that illustrates contents of hierarchical levels used for training and testing the hierarchical single-instrument source-specific separation (SSS) networks, in accordance with an example embodiment.

FIG. 4B shows Table 2 that illustrates improvement in scale-invariant source-to-distortion ratio, or SI-SDR (dB), for hierarchical SSS (Guitar) and QBE models, in accordance with an example embodiment.

FIG. 4C shows Table 3 that illustrates non-hierarchical and hierarchical SSS and QBE model results in terms of SI-SDR (dB), in accordance with an example embodiment.

FIG. 4D shows Table 4 that illustrates SI-SDR improvement (dB) over the unprocessed audio mix ("Mix") for hierarchical SSS and QBE models (separated by the thick broken line), in accordance with an example embodiment.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Figure 1A:
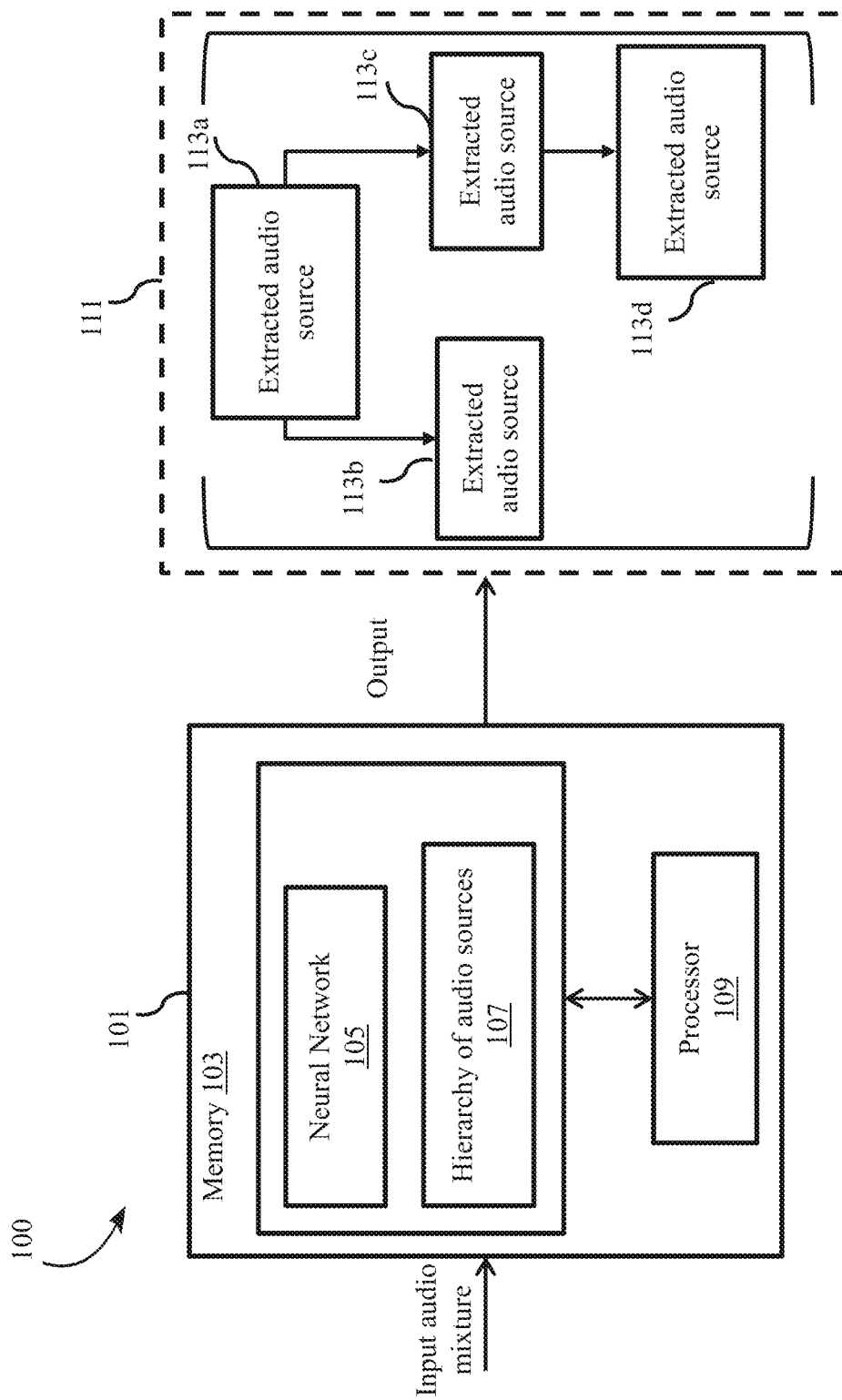
FIG. 1A illustrates a block diagram of the audio processing system for hierarchical audio separation, in accordance with an example embodiment.

FIG. 1A illustrates a block diagram 100 of the audio processing system 101 for hierarchical audio separation, in accordance with an example embodiment. FIG. 1A provides a high-level view of the proposed audio processing system 101 for audio source separation. The audio processing system 101 obtains an input audio mixture. The input audio mixture comprises multiple audio signals from multiple different audio sources. For example, the input audio mixture may comprise sounds of multiple musical instruments such as guitar, piano, drums, or the likes. In another embodiment, the input audio mixture may comprise sounds of multiple engines, multiple sounds of humans, multiple sounds of animals, multiple natural sounds, or the like. It is an objective of some embodiments of the present disclosure to extract multiple audio sources 113a, 113b, 113c, and 113d (also called as multiple audio sources 113a-113d) from the input audio mixture and simultaneously determine mutual relationships between the extracted multiple audio sources 113a-113d.

To that end, the audio processing system 101 comprises a memory 103 configured to store a neural network 105 that is trained to separate audio sources from an audio mixture subject to hierarchical constraints enforcing a parent-children hierarchy on the audio sources, such that a parent audio source in the parent-children hierarchy is a mixture of its one or multiple children audio sources. Thus, the neural network 105 extracts, from the input audio mixture, multiple audio source signals comprised by the input audio mixture. Further, the input audio mixture is subjected to hierarchical constraints that enforces a parent-children hierarchy 111 of multiple audio sources 113a-113d corresponding to the extracted multiple audio source signals. The extracted multiple audio sources 113a-113d may correspond to only a portion of audio sources comprised by a predefined hierarchy of audio sources 107. The multiple audio sources 113a-113d are extracted in a hierarchical tree structure as defined in the hierarchy of audio sources 107, where the hierarchical tree structure may comprise at least one grandparent, at least one parent, and at least one child (or leaf node). In another embodiment, the audio processing system 101 further extracts the hierarchical path comprising at least one grandparent or at least one parent and at least one child.

The hierarchical constraints may impose constraints on the extracted multiple audio sources 113a-113d such that a child audio source comprises at least one set of audio properties that are comprised by its parent audio source. Thus, the hierarchical constraints enforce a hierarchy on audio properties of the extracted audio sources 113a-113d, such that audio properties of a parent audio source 113a are a union of values of the audio properties of its one or multiple children audio sources 113b-113d. In another embodiment, the hierarchical constraints may define how children audio sources are mixed in order to determine their parent audio sources. In other words, a parent audio source includes a mixture of its children audio sources.

The parent-children hierarchy 111 of the extracted multiple audio sources 113a-113d is determined based on the hierarchy of audio sources 107. In some embodiments, the hierarchy of audio sources 107 is predetermined and comprises a set of all possible audio sources that are associated with the input audio mixture and mutual relationships between the audio sources in the set. The set of audio sources depends on the type of audio sources required to be extracted. For example, in an application of musical source separation the set of audio sources comprise different musical instruments such as acoustic guitar, electric guitar, drums, or the likes.

In response to receiving the input audio mixture, the audio processing system 101 submits the input audio mixture to the neural network 105. The neural network 105 extracts audio sources corresponding to the parent-children hierarchy 111 of the extracted multiple audio sources from the input audio mixture, and render at least a portion of the extracted multiple audio sources 113a-113d along with mutual relationships between the extracted multiple audio sources 113a-113d in terms of parent-children hierarchy of the extracted multiple audio sources 113a-113d, where 113a is a grandparent source node who has two children 113b and 113c. 113b and 113c are siblings. Further, 113c is a parent source node where the parent source node 113c has one child 113d. The child source nodes 113b and 113d are also called leaf nodes as they are the last source nodes in the parent-children hierarchy 111. The hierarchical constraints ensure that the parent audio source (for example, 113a) comprises audio properties or energy comprised by all its children (for example, 113b and 113c) and grandchildren (for example, 113d). Thus, the parent audio source in the parent-children hierarchy is a mixture of its one or multiple children audio sources.

In some embodiments, the hierarchical constraint enforces that any time-frequency regions in a spectrogram that the neural network 105 assigns to one or more child sources (e.g., the acoustic guitar source) must also be assigned to the parent source (e.g., all guitars). Specifically, for each time-frequency point in the spectrogram, the hierarchical constraint enforces that the output for the parent source is the maximum of the outputs from the parent source and the child source. The set of audio sources depends on the type of applications. For example, in an application of musical source separation the set of audio sources comprises different musical instruments.

Figure 1B:
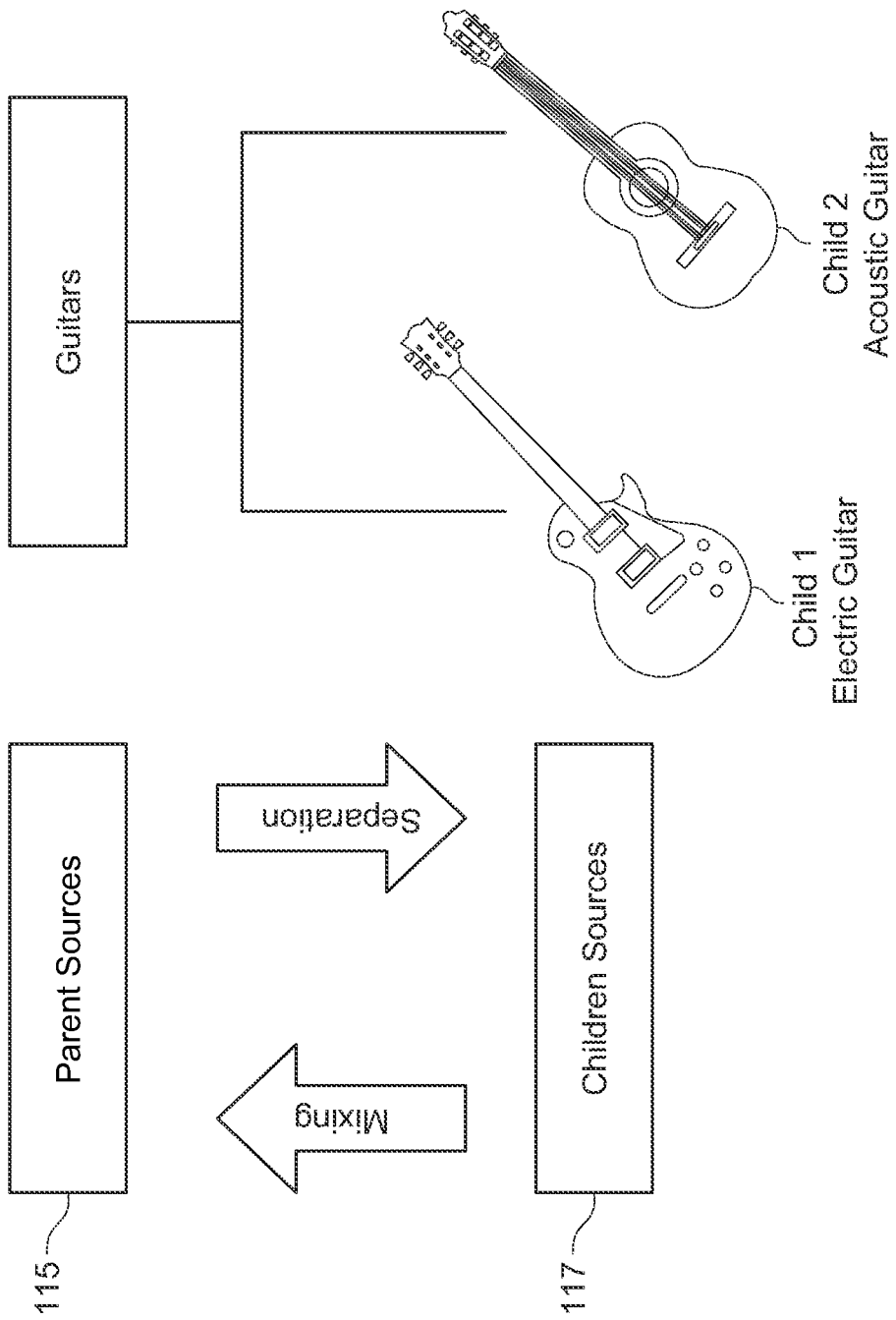
FIG. 1B illustrates mutual relationship between parent sources and corresponding child sources, in accordance with an example embodiment.

In an example embodiment, the set of audio properties used to extract multiple audio sources may comprise one or combination of physical properties of multiple audio sources, signal characteristics of the input audio mixture that is generated by the multiple audio sources, and contextual information indicating co-occurrence of audio in the input audio mixture. In another embodiment, the set of audio properties may comprise a number of tonal components in the input audio mixture, tone-to-noise ratio, and cepstrum peak amplitude FIG. 1B illustrates mutual relationship between parent sources 115 and corresponding child sources 117, in accordance with an example embodiment. The hierarchical constraints ensure a hierarchical mutual relationship between the parent sources 115 and the child sources 117 such that parent sources 115 comprise a set of audio properties, where the set of audio properties of the parent sources 115 includes set of audio properties of its children or child sources 117. The set of audio properties of parent sources 115 is such that for each audio property its set of attributes is the union of the set of attributes of the children 117 for that audio property, where the set of attributes is the set of values that the audio property can take. In an example embodiment as illustrated in FIG. 1B, the parent source 115 may correspond to audio signal of all guitars. The parent source "guitars" may comprise a set of attributes corresponding to an electric guitar (child 1) and an acoustic guitar (child 2). Further, in order to extract different audio sources from the input audio mixture, the audio processing system 101 may initially extract only children audio sources corresponding to leaf nodes of the parent-children hierarchy 111 from the input audio mixture using the neural network 105. The system 101, further, reconstructs at least one parent audio source of a parent node of the parent-children hierarchy 111 by mixing the children audio sources according to one or more multiple paths on the parent-children hierarchy leading to the parent node. (as indicated in FIG. 1B). Further, the audio processing system 101 may also be configured to separate child sources from the parent sources by using different masks (or filters). A detailed description of the one or multiple paths is provided below with respect to FIG. 1C.

In another embodiment, the mutual relationship between extracted multiple audio sources may also enable a user to combine two or more audio sources from the extracted multiple audio sources and generate a new audio signal altogether. To that end, the audio processing system 101 may interpolate different audio sources by mixing the children audio sources using different weights applied to different children sources. A detailed description on interpolating children audio sources using different weights is provided below with respect to FIG. 6A.

In some embodiments, the audio processing system 101 extracts at least one path from the predefined hierarchy 107 based on the input audio mixture such that end of the extracted path comprises at least one target audio source, where audio signals from the target audio source are present in the input audio mixture. A detailed description of the path is provided below with respect to FIG. 1C.

Figure 1C:
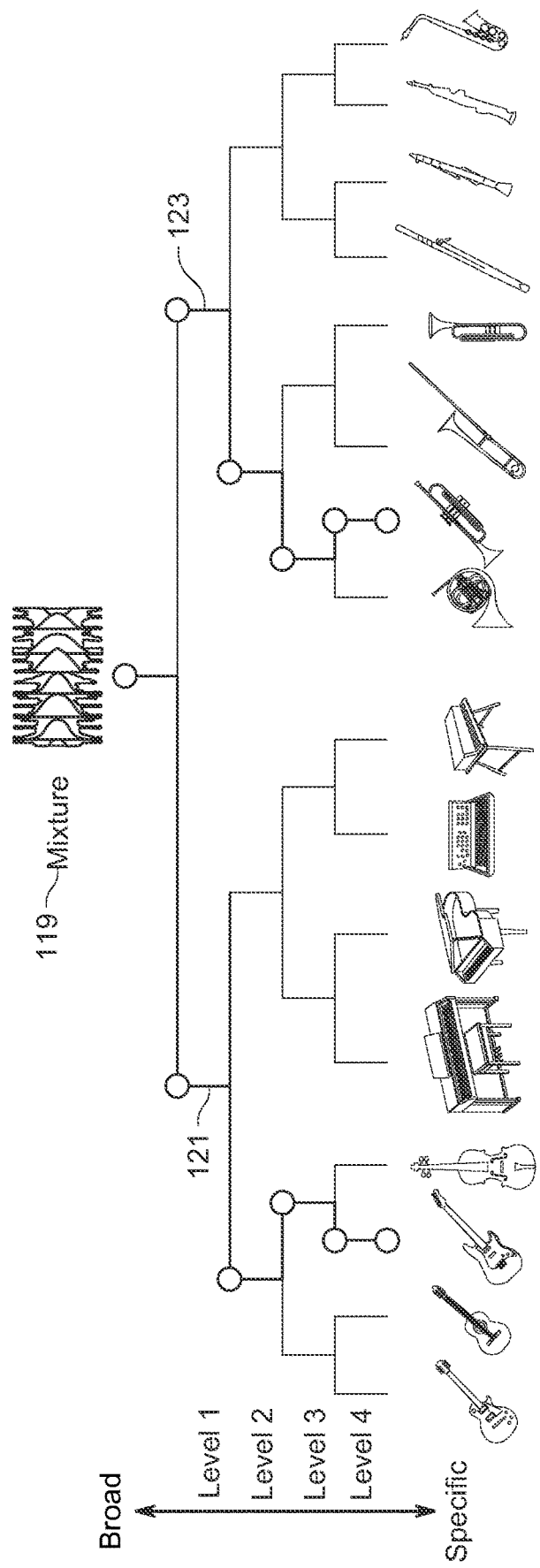
FIG. 1C illustrates a plurality of paths extracted by the audio processing system from a predefined hierarchy, in accordance with an example embodiment.

FIG. 1C illustrates a plurality of paths (121, 123) extracted by the audio processing system 101 from a predefined hierarchy, in accordance with an example embodiment. FIG. 1C illustrates the predefined hierarchy (similar to the predefined hierarchy 107) associated with musical instruments. In this example, the predefined hierarchy comprises four levels (Level 1, Level 2, Level 3, and Level 4). The hierarchy of musical instruments is arranged from broad level to narrow (or specific) level, where Level 1 corresponds to broadest level and Level 4 corresponds to the narrowest level. Further, audio source nodes at the broad level comprises a mixture audio signals of plurality of musical instruments and audio source nodes at the lowest level (fourth level in this case) comprises audio signal corresponding to a specific musical instrument such as guitar, piano, or the likes. Initially, the audio processing system 101 receives an input audio mixture 119. The input audio mixture 119 comprises a musical performance generated using multiple musical instruments.

Consider the musical performance comprises audio signals from a guitar and a trumpet along with audio sources from other musical instruments. On reception of the input audio mixture 119, the audio processing system 101 filters the input audio mixture 119 at each level forming a path from the broadest level to the narrowest level in order to extract a particular audio source. The audio processing system 101 may extract the audio sources along the extracted path.

For example, the audio processing system 101 may extract a path 121 such that a leaf node at the end of the path 121, where the leaf node corresponds to the guitar. Similarly, a path 123 may be extracted such that a leaf node at the end of the path 123 corresponds to the trumpet. The audio processing system 101 may indicate the entire path to the user, where each source node in the path may be indicated with audio signals comprised by that source node. In an example embodiment, the system 101 may provide different identifications to parent source nodes, sibling source node, and children source nodes that may enable the user to easily analyze different audio sources present in the input audio mixture 119 and may enable the user to combine different audio sources to make different audio signals altogether.

Auditory Hierarchies

As used herein, hierarchical constraints enforce a parent-children hierarchy on the audio sources, such that a parent audio source in the parent-children hierarchy includes its one or multiple children audio sources. The hierarchical constraints can be enforced during the source separation, training of the neural network performing the separation, or both. The separated audio sources are related the nodes of in the parent-children hierarchy. In such a manner, the extracted audio sources are mutually related to each other according to the hierarchy.

There are a number of ways how to enforce such relationship, and therefore, the hierarchical constraints vary among different embodiments. The hierarchical constraints can enforce the parent-children hierarchy directly, indirectly, or in combination thereof. Examples of direct enforcement of hierarchical constraints include defining the hierarchy of audio sources as leaf audio sources corresponding to leaf nodes of the hierarchy and non-leaf audio sources corresponding to non-leaf nodes of the hierarchy and directly matching the outputs of audio separation to one of the nodes. For example, one embodiment separates only leaf audio sources and forms the non-leaf audio sources by combining their children leaf audio sources. In such a manner, the parent audio sources are guaranteed to be mixtures of their children. Additionally, or alternatively, one embodiment separates a sequence of audio sources according to a path in the parent-children hierarchy such that each subsequent audio source includes all previous audio sources.

Examples of indirect enforcement of hierarchical constraints include enforcing relationships of energy and/or values of the audio properties of audio sources according to the parent-children hierarchy. For example, one embodiment estimates masks that when applied to the audio mixture extracts corresponding audio sources. In this embodiment, the hierarchical constraints enforce that energy of a mask corresponding to a parent audio source is not less than energy of a mask corresponding to any of its children audio sources. Additionally, or alternatively, one embodiment ensures that values of the audio properties of the parent node include values of the corresponding audio properties of its children. For example, in some implementations, audio properties of the parents are such that for each property, its set of attributes is the union of the set of attributes of the children for that property, where the set of attributes is the set of values that the property can take.

Notably, while the parent-children hierarchy is defined in advance for a set of audio sources, during the audio source extraction, only estimation of a subset of audio sources of an interest that are present in the audio mixture is extracted. The subset of audio sources can be defined in advance or specified in execution time. In some embodiments, the subset of audio sources corresponds to a path on the parent-children hierarchy of the set of audio sources starting at a root node till a leaf node. Additionally, or alternatively, the subset of the audio sources can skip one or multiple audio sources on the path and/or include the audio sources from other paths of the hierarchy.

During the source separation, the audio sources are estimated with the trained neural network. While the neural network is trained on training data of various quality, the estimates of the extracted audio sources can vary for different execution based on content of the input audio mixture. However, to enforce the hierarchical constraint, the estimation of the parent audio source includes the estimation of its child in the provided input audio mixture. This inclusion would also enforce hierarchical relationship of audio properties useful for a number of applications. For example, in some embodiments, audio properties of the at least one extracted parent audio source include a union of audio properties of the extracted at least one children audio source. Examples of audio properties of an audio source include one or combination of spectral characteristics, contextual information, tonal components, tone-to-noise ratio values, and cepstrum peak amplitudes.

In some embodiments, the hierarchical constraints are enforced on training data used to train the network, wherein the network is trained to estimate at least a parent audio source and at least one of its children audio sources, and the ground truth training data for the parent audio source is such that it is the mixture of the ground truth training data for its children audio sources. In such a manner, the execution of the trained neural network produces the outputs having hierarchical relationships. Such a hierarchical, e.g., mutual, relationship can be exploit by subsequent processing, such as anomaly detection, audio zooming, etc.

In some embodiments of the present disclosure, the mutual relationship between the extracted multiple audio sources 113a-113d is obtained by arranging each audio source of the extracted multiple audio sources 113a-113d in a hierarchical order of sound producing objects. In the hierarchy of the sound producing objects, top levels of the hierarchy correspond to broad groups and lower levels are more specific. For example, in a hierarchy of musical instruments, the top levels of the hierarchy may comprise midrange stringed instruments and lower levels may comprise acoustic guitars. Further, with regard to source separation, an auditory hierarchy may be defined such that sources at higher levels in the hierarchy are composed of mixtures of sources at lower levels of the hierarchy. Each source node can potentially be further separated into one or more child sources and combined with its siblings to create parent sources. Considering a hierarchy with L levels, $S_{l,c}$ denotes the c-th source type node at hierarchy level l, for l=1, ..., L, where it is assumed that the set of leaf source types $S_{l,c}$ cannot be decomposed into further source types, and $S_{L,1}$ is the sole source type at the top of the hierarchy and includes all source types. Further, $C_{l,c}$ denotes the set of indices of the child sources at level l−1 of $S_{l,c}$. The hierarchy can be defined as:

$$S_{l,c} = U_{c' \in C_{l,c}} S_{l-1,c'}, \forall l=2, \ldots, L \qquad (1)$$

A path down the hierarchy may be defined as a sequence of source types from a beginning source type node $S_a$ to a destination source type node $S_b$ at a lower level.

In some embodiments, the hierarchy defined using equation (1) above may be used to decompose an audio mixture x. Let $s_{l,c}$ denote the corresponding source component in x whose source type is $S_{l,c}$, where the submix of all signals of the same type are considered as a single component. By definition, $S_{L,1}$=x. Each c-th source component $s_{l,c}$ at a level l can be decomposed into source components $s_{l-1,c'}$, such that $s_{l-1,c'}$ is the signal corresponding to all sources belonging to the child source type $S_{l-1,c'}$:

$$s_{l,c}=\Sigma_{c'\in C_{l,c}} s_{l-1,c'}, \text{ s.t. } s_{l-1,c'}\in S_{l-1,c'}, \qquad (2)$$

for l=2, ..., L. For simplicity, let the sum operator denote mixing, although the mixing process is often more complex than a simple summation of signals.

In some embodiments of the present disclosure, auditory hierarchies composed of mixtures of musical instruments are analyzed. Some embodiments are based on the realization that the hierarchical formulation can be applied to mixtures with any type of source content.

Hierarchical Source Separation

In a non-hierarchical setting, source separation can be formulated as estimating C complex spectrograms, $S_c \in \mathbb{C}^{F \times T}$ for c=1, ..., C, that represent a set of desired sources within the spectrogram $X \in \mathbb{C}^{F \times T}$ of an input audio mixture. In this general formulation, it is not necessary that a source $S_c$ have any relationship to source $S_d$, for c≠d. In some embodiments, for a given input audio mixture X, the proposed audio processing system 101 is implemented as a hierarchical source separation system that uses a hierarchical separation algorithm under a given hierarchy and may attempt to extract one or more submixes, each of which corresponds to all sources belonging to some source type $S_{l,c}$ at a level l. For instance, separating out all guitars (acoustic and electric) from a mixture that includes electric guitar, acoustic guitar, piano, and drums (as depicted in FIG. 1I).

Figure 1D:
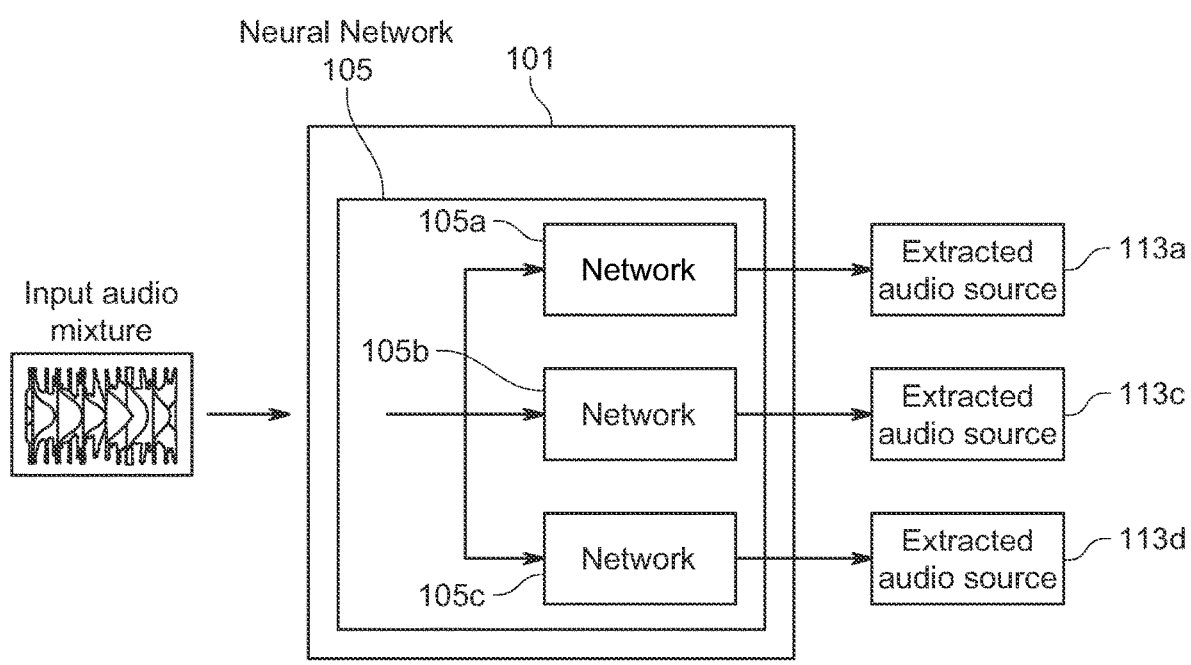
FIG. 1D illustrates the audio processing system with one network to extract an audio source per level in the parent-children hierarchy, in accordance with an example embodiment.

FIG. 1D illustrates the audio processing system 101 with one network to extract an audio source per level in the parent-children hierarchy 107, in accordance with an example embodiment. In FIG. 1D, the neural network 105 comprises multiple neural networks 105a, 105b, and 105c (also called as multiple neural networks 105a-105c), where each network of the multiple neural networks 105a-105c extract audio source nodes 113a, 113c, 113d at their corresponding levels such that the extracted audio sources are arranged in a hierarchical manner. In this case, each network of the multiple neural networks 105a-105c is trained separately to extract a specific audio source. The extracted audio sources 113a, 113c, 113d are arranged hierarchically based on the predetermined parent-children hierarchy 107 (not shown in FIG. 1D).

Figure 1E:
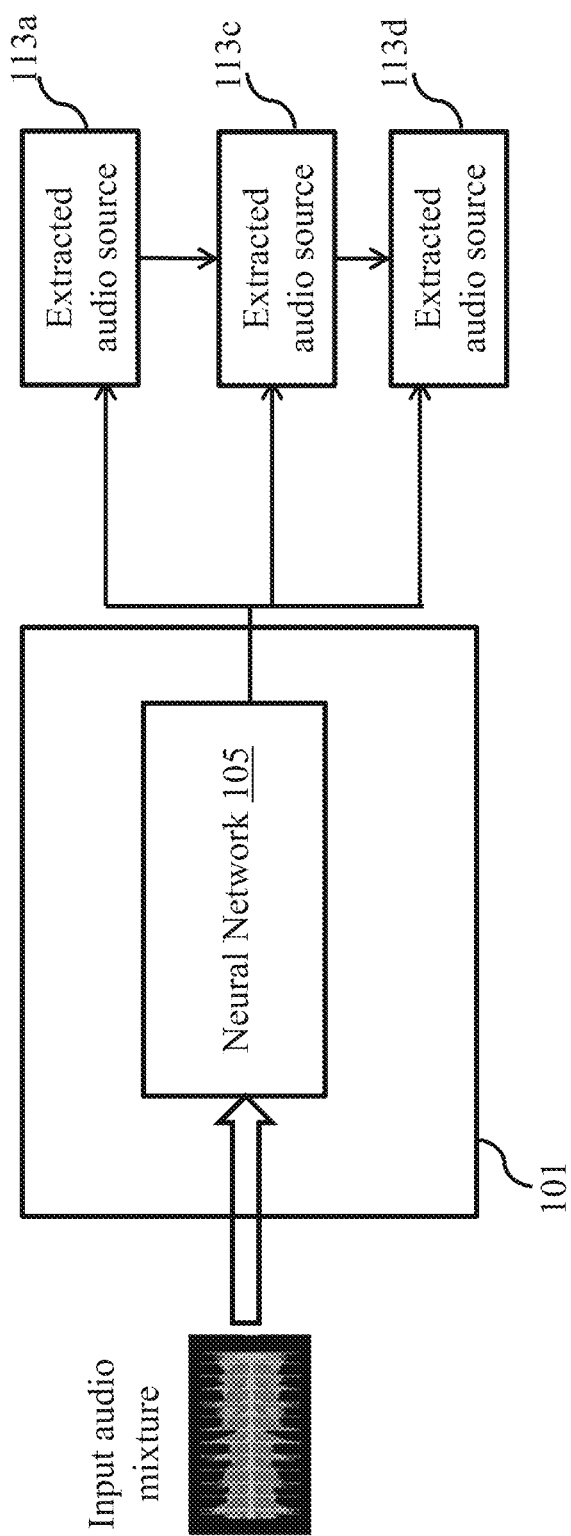
FIG. 1E illustrates the audio processing system with one network to extract audio sources at all levels in the parent-children hierarchy, in accordance with an example embodiment.

FIG. 1E illustrates the audio processing system 101 with one network to extract audio sources at all levels in the parent-children hierarchy 107, in accordance with an example embodiment. In this case, the neural network 105 is trained jointly to extract all the audio sources 113a, 113c, 113d from the input audio mixture in a hierarchical manner. Further, the extracted audio sources 113a, 113c, 113d are arranged hierarchically based on the predetermined parent-children hierarchy 107 (not shown in FIG. 1E). The multi-level network described above may increase the scalability of the audio processing system as only one neural network is used to extract multiple audio sources.

Notably, the neural network 105 jointly trained to extract multiple audio sources according to their hierarchical relationships can be more efficient than a combination of different neural networks 105a, 105b, and 105c trained for a specific audio source.

Further, some embodiments implement the neural network 105 for a hierarchical audio source separation using a source-specific separation (SSS) network or a query-by-example (QBE) network.

Hierarchical Source-Specific Separation

Some source-specific separation (SSS) networks based on mask inference typically attempt to estimate a real-valued mask $\hat{M}_c \in \mathbb{R}^{F \times T}$ for a single target source c by minimizing some distortion measure between the source estimate obtained from the mask and a reference $S_c$. An objective function to minimize the distortion can be implemented using a truncated phase sensitive approximation (tPSA) objective:

$$L_{tPSA}=\|\hat{M}_c \odot |X|-T_0^{|X|}(|S_c| \odot \cos(\angle S_c - \angle X)\|_1, \qquad (3)$$

where $\odot$ denotes element-wise product, $|Y|$ and $\angle Y$ denote the magnitude and phase of a spectrogram Y, and $T_0^{|X|}$(x)=min(max(x,0),|X|) is a truncation function ensuring the target can be reached with a sigmoid activation function. The estimated mask $\hat{M}_c$ is element-wise multiplied with the original mixture spectrogram X to obtain an estimate for the target source $S_c$.

Some embodiments build hierarchical SSS networks by training single networks to output a single node $S_{n,c}$ at a given level of the hierarchy. Each such single-level network can be trained to minimize the tPSA objective above, where the target source is $S_{n,c}$ the component corresponding to the targeted source type in the hierarchy within the mixture X. Each of these networks outputs one mask $\hat{M}_{n,c}$ for its targeted source type, and they are trained independently of each other.

Some embodiments implement a multi-level strategy in which the neural network 105 is trained to output multiple levels of the hierarchy at once. A potential advantage of this strategy is that the neural network 105 may be able to leverage learned knowledge about a mask $\hat{M}_{n,c}$ to reinforce and improve its estimate for another mask $\hat{M}_{n',c'}$ in the hierarchy. In some embodiments, a single network that outputs N masks for N levels along a single path down the hierarchy (for example, [strings/keys]→[guitars]→[clean guitars], where "clean" indicates acoustic and electric guitars with no overdrive or distortion applied) is implemented. In other embodiments, multiple paths down the hierarchy are simultaneously extracted. In other embodiments, all nodes of the hierarchy are considered and extracted. In some embodiments, the network outputs a mask for each leaf node in the hierarchy, and submixes corresponding to the parents are recomposed from the leaf sources while travelling through the hierarchy, training the neural network 105 by combining loss functions for all nodes in the hierarchy.

During training, the objective of the network 105 is to simultaneously reconstruct the extracted multiple audio sources 113a-113d at all levels L of the parent-children hierarchy 111, that is there is a tPSA objective (equation 3) term for each level of the parent-children hierarchy 111, and the overall loss is the sum over levels L in the parent-children hierarchy 111. The neural network 105 may be trained to output, simultaneously, masks for audio sources of different levels of the parent-children hierarchy 111 subject to the hierarchical constraints while minimizing the objective function tPSA for each level of the parent-children hierarchy 111.

In an example embodiment, suppose that the network 105 outputs 1 parent source node and 2 children source nodes, then the network 105 is trained in such a way that the first output always corresponds to the parent source node, the second output always corresponds to the first child source node, and the third output always corresponds to the last child source node. That is during training of the network 105, the true submix for the parent source would be used as the target for the first output in the network 105, the true signal for the first child source node would be used as the target for the second output and so on. In an example embodiment, the SSS network 105 may be configured with outputs of 1 grandparent→1 parent→1 child.

Hierarchical Query-by-Example (QBE)

In order to capture the mutual relationships between different audio sources in the audio source hierarchy, some embodiments separate multiple instruments at different levels with a single network. A hierarchical SSS network that uses one network per level only allows the network to learn one node in the hierarchy at a time. A hierarchical SSS network that uses a multilevel network along a single path down the instrument hierarchy cannot model other instruments. A hierarchical SSS network that models all nodes of the hierarchy may extract mutual relationships between different audio sources in the audio source hierarchy, but any sufficiently realistic hierarchy likely contains dozens of leaf nodes, which may lead to memory and computation issues as well as difficulties balancing the contributions of all the losses. To alleviate these potential issues, in some embodiments, the audio processing system 101 uses a query-by-example (QBE) network.

The QBE network takes as inputs a mixture and an example (or a query audio) of the desired source to separate from the input audio mixture. The QBE network may be used to model an entire hierarchy of audio sources (for example, musical instrument hierarchy) for source separation. In an example embodiment, instead of conditioning on a query audio, separation may be conditioned on the leaf node label which leads to a hierarchical extension of conditional source separation methods. The query audio may be considered as a generalization of a class label, and QBE may further provide the ability to interpolate to unseen source types during inference.

In some embodiments, the audio processing system 101 accepts the input query audio along with the input audio mixture, and outputs a portion of the extracted multiple audio sources 113a-1113d corresponding to a path along the parent-children hierarchy 111 ending at an audio source of the same source type as the input query audio. The path along the parent-children hierarchy 111 comprises a plurality of source nodes, where each source node corresponds to a type of audio source. Each source node comprises at least one child audio source, and each source node, in combination with a sibling source node, creates a parent source node.

Some embodiments implement a QBE network (or a hierarchical QBE network) that relies on two networks, a query net and a masking net. The query net calculates a query anchor $A_q \in R^k$ for some input query audio $Q \in R^{F \times T_q}$ as a weighted sum of k-dimensional query embedding $V_{q,i}$ produced by the network at each time-frequency bin $i=(f,t)$ of the query spectrogram space:

$$A_q = \frac{\Sigma_i P_{q,i} V_{q,i}}{\Sigma_i P_{q,i}} \quad (4)$$

where $P_q \in R^{FT_q}$ is a query presence vector for query Q, defined such that $P_{q,i}=1$ if the magnitude at bin $i=(f,t)$ is above a threshold (set to −60 dB from the maximum), and 0 otherwise. The query anchor $A_q$ is concatenated with the frequency vector of the mixture $X_t$ at each frame t, and used as input to the masking network, which produces, for each hierarchy layer n of interest, a mask $\hat{M}_{n,c}$ for a target source $s_{n,c}$ which is in the same node $S_{n,c}$ of the hierarchy as the query Q. This architecture is illustrated in FIG. 1I.

The QBE system is trained to minimize the tPSA objective in equation (3) based on a target source $s_{n,c}$, where the target source used to train the neural network 105 is determined both by the query and a given level in the hierarchy. In an example embodiment, the loss functions includes a term directly defined on the query embedding space.

In an example embodiment, the QBE system may be trained using a query audio (for example, an acoustic guitar) as follows. The acoustic guitar query is used to train the neural network 105 that attempts to extract the corresponding sources at the leaf node level, in which case the target will consist of the submix of all clean guitars in the mixture. Further, the same acoustic guitar query may also be used to train the neural network 105 that attempts to extract the corresponding sources one level up, in which case the target will consist of the submix of all guitars in the mixture, regardless of whether they are clean guitars or not. Further, the QBE system is trained to output silence when a source node associated with the input audio query is absent in the plurality of the source nodes of the hierarchy of audio sources 107. The notification may inform a user about the absence of any audio source node associated with the input query audio in the form of buzzer or a message.

In another embodiment, a single-level QBE network may be implemented for some level in the hierarchy and only separate instruments at that level. Alternatively, a hierarchical multi-level QBE network that returns multiple (or even all) levels of the hierarchy may be implemented. To that end, some embodiments further enforce hierarchical constraints on the outputs of the network.

Constraints on Hierarchical Masks

Some embodiments are based on the realization that by assuming that components of a mixture exist in some hierarchy, knowledge about structure of the components may be used to impart constraints on the neural network 105. For instance, the relationship defined in equation (2) to require the set of masks produced by a multi-level hierarchical network may be used to follow the same structure as the hierarchy, namely that masks at higher levels be composed of masks at lower levels.

However, this would require to output masks for every node in the hierarchy, which may not be feasible for a large hierarchy encountered in practice. Therefore, imposing a hierarchical constraint that does not depend on knowledge of the whole hierarchy may be used. This hierarchical constraint requires that masks at higher levels in the hierarchy must apportion at least the same amount of energy as masks at lower levels. More precisely, the mask at level l is set as:

$$\hat{M}_l = \max(\hat{M}_l', M_{l-1}) \quad (5)$$

where max is applied element-wise to every TF bin, and $\hat{M}_l'$ is the mask estimate output by the network for level l. In some embodiments, the audio processing system 101 is configured to receive input data indicative of a target audio source, and where the audio processing system 101 extracts, from the input audio mixture, the target audio source and parents of the target audio source according to the parent-children hierarchy 107. The input data include a label of a node in the parent children hierarchy, where the label may comprise information that indicates the target audio source such as text data stating a name of the target audio source to be extracted from the input audio mixture. In an example embodiment, the label may include a speech signal of a user, where the speech signal comprises a name of the target audio source that the user desires to extract from the input audio mixture.

In some embodiments, the audio processing system 101 receives the input data that include a query audio signal, such that the neural network 105 is trained to separate a child audio source closest to the query audio signal and parents of the child audio source according to the parent-children hierarchy 107. The query audio signal may comprise audio signal associated with the target audio source. A detailed description of extracting the target audio source, from the input audio mixture, by the audio processing system 101 based on different types of input data indicative of the target audio source is provided below with reference to FIGS. 1F-1H.

Figure 1F:
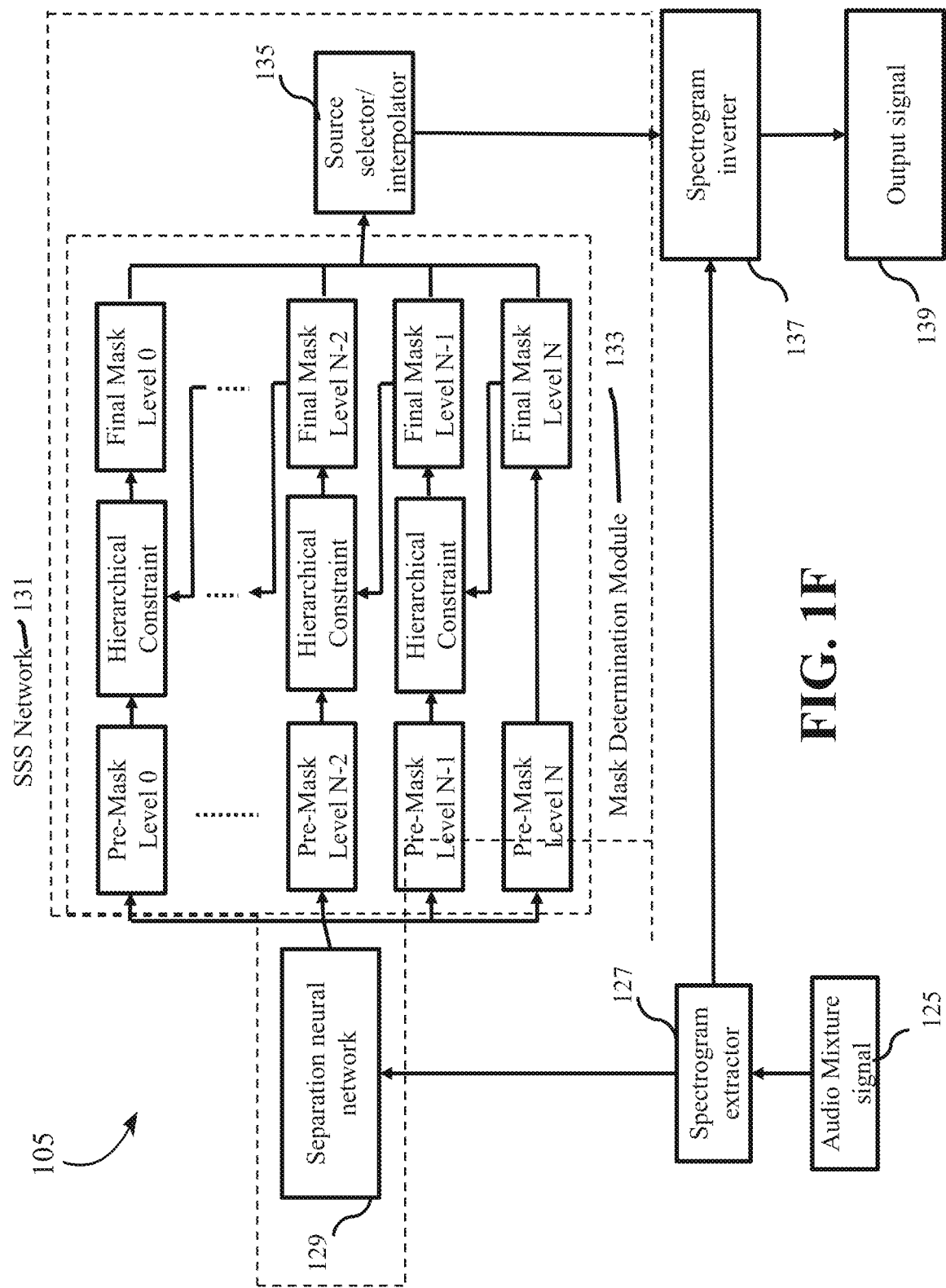
FIG. 1F is a schematic diagram illustrating different components of the neural network in the audio processing system, where the network is trained for source-specific separation (SSS), in accordance with an example embodiment.

FIG. 1F is a schematic diagram illustrating different components of the neural network 105 in the audio processing system 101, where the network 105 is trained for source-specific separation (SSS), in accordance with an example embodiment. The input audio mixture signal 125 is provided to a spectrogram extractor module 127, where the spectrogram extractor module 127 is configured to produce a spectrogram for a sequence of frames of the input audio mixture 127. The input audio mixture spectrogram is processed by a separation neural network 129 composed of various layers of learned weights that can process inputs in a memoryless manner via matrix multiplication or convolution operations, or connected in a recurrent manner with memory. Each layer also has one or more non-linear operations, which allow the separation neural network 129 to learn the mapping from the spectrogram of the input audio mixture signal 125 to time-frequency masks that when multiplied with the input mixture spectrogram recover the spectrogram of isolated. The output of the separation neural network 129 is provided to a mask determination module 133 that outputs multiple masks, one per every relevant node in the hierarchy. The mask determination module 133 is configured to form outputs of the neural network 105 into a set of masks corresponding to the extracted audio sources at different levels of parent-children hierarchy 111, such that an application of a mask to the spectrogram extracts the corresponding audio source. Further, the hierarchical constraints enforce that masks at higher levels in the parent-children hierarchy 111 to apportion at least the same amount of energy as masks at lower levels in the parent-children hierarchy 111. In an example embodiment, the separation neural network 129 may itself comprise the mask determination module 133.

Further, the SSS network 131 is pre-specified to have a fixed number of outputs, one for each relevant level in the parent-children hierarchy 111. To that end, the SSS network 131 is configured to generate a plurality of N masks corresponding to N levels along a path in the parent-children hierarchy 111. The SSS network 131 is configured to output, based on the parent-children hierarchy 111, source nodes corresponding to the plurality of masks. Thus, the outputs of the SSS network 131 have an order that matches with the parent-children hierarchy 111.

Further, each mask outputted by the mask determination module 133 is provided to a source selector/interpolator module 135. The source selector/interpolator module 135 is configured to select a single mask, for example the mask corresponding to one child or parent, or a subset of hierarchy level masks to output. The source selector/interpolator module 135 selects mask from the set of masks according to a target output (or target audio source) to be separated. In some embodiments, the source selector/interpolator module 135 selects masks, formed by the mask determination module 133, corresponding to nodes on a single path in the parent-children hierarchy.

Furthermore, the source selector/interpolator module 135 can interpolate between multiple masks, to obtain for example, 80% of the child source with 20% of the parent audio source mixed in. Each mask output by the source selector/interpolator module 135 is then multiplied with the complex spectrogram of the input audio mixture signal 125 to obtain spectrogram associated with a target source signal, where the target source signal is associated with the hierarchy of target source type for which the SSS system 131 was trained (for example, guitar).

The output of the source selector/interpolator module 135 is provided to a spectrogram inverter module 137, where audio sources are extracted from the complex spectrogram of input audio mixture signal 125 and provided as output signals 139. The spectrogram inverter module 137 is configured to apply the masks selected by the source selector/interpolator module 135 to the spectrogram to extract the audio sources from the input audio mixture. In an example embodiment, the source selector/interpolator module 135 interpolates at least two masks, such that the spectrogram inverter module 137 applies the interpolated masks to the spectrogram to extract the audio source. In another example embodiment, the spectrogram inverter module 137 performs inverse short time Fourier transforms to extract the audio sources. This process is repeated for the mask corresponding to each level of the hierarchy, or for any combination of sources returned by the source selector/interpolator module 135.

Figure 1G:
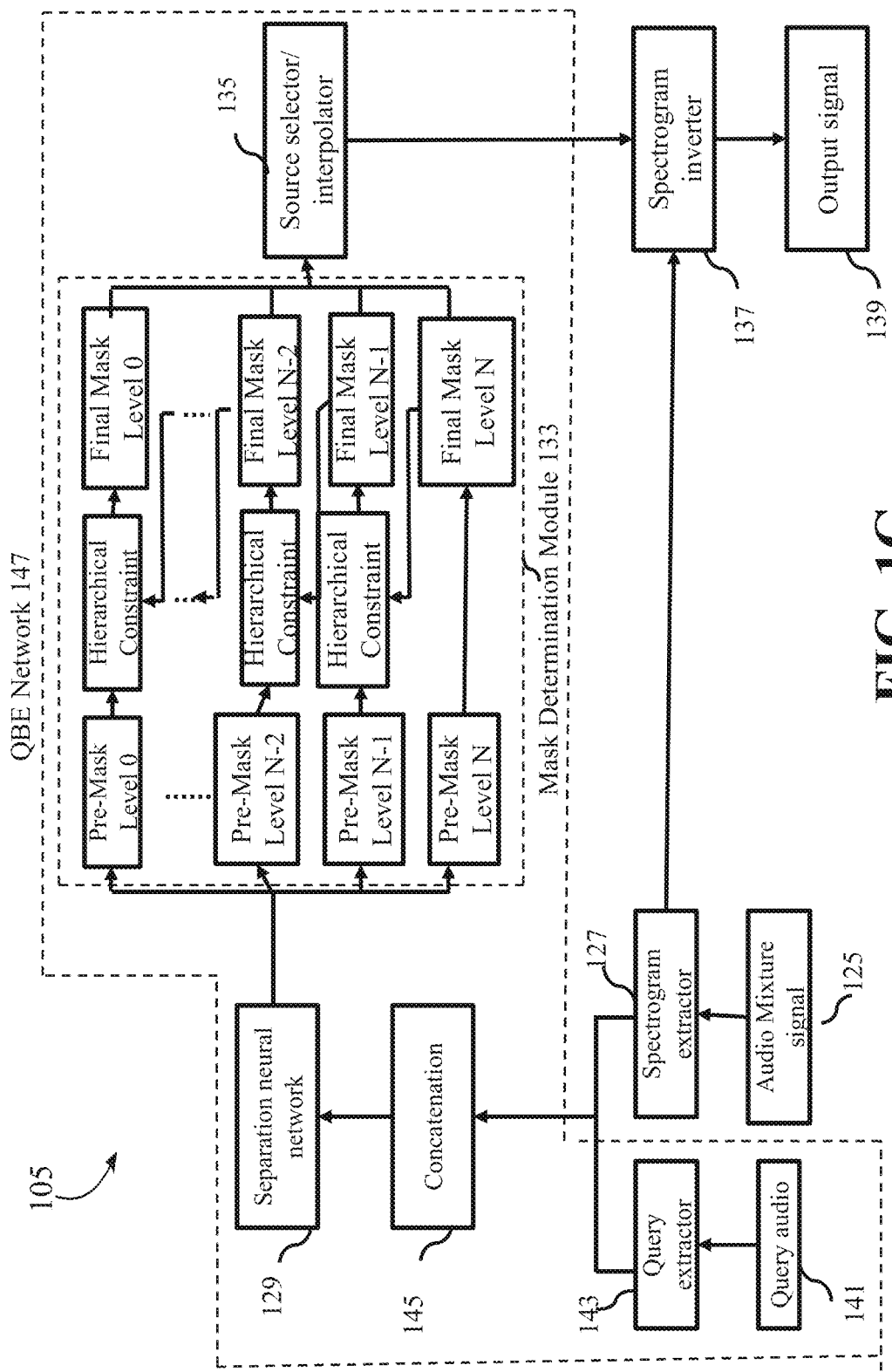
FIG. 1G is a schematic diagram illustrating different components of the neural network in the audio processing system, where the network 105 is trained for query by example (QBE) separation, in accordance with an example embodiment.

FIG. 1G is a schematic diagram illustrating different components of the neural network 105 in the audio processing system 101, where the network 105 is trained for query by example (QBE) separation, in accordance with an example embodiment. The QBE network 147 obtains an input audio mixture signal 125 and an input query audio 141. The input audio mixture signals 125 is provided to a spectrogram extractor module 127, where a complex spectrogram of the input audio mixture signal 125 may be determined. Further, the input query audio 141 is provided to the query extractor 143 where the query extractor 143 processes the query audio signal to obtain an anchor node. The anchor node is a vector used for the QBE network 147, to encode the information in the input query audio signal 141 in a compact way. Further, the anchor node (or anchor vector) and the complex spectrogram of the input audio mixture signal 125 is provided to a concatenation module 145, where the anchor node is concatenated with each frame of the input audio mixture signal spectrogram and is provided to a separation neural network 129 to dynamically extract the sound sources from the input audio mixture signal 125 most similar to the query audio signal 141 that has been provided to the system 101. The separation neural network 129 produces outputs representing masks of audio sources most similar to the query audio signal in the parent-children hierarchy 111. The separation neural network 129 is similar to the separation neural network used for SSS models in FIG. 1F, but with a larger input feature vector to accommodate the concatenated query anchor vector.

Figure 1H:
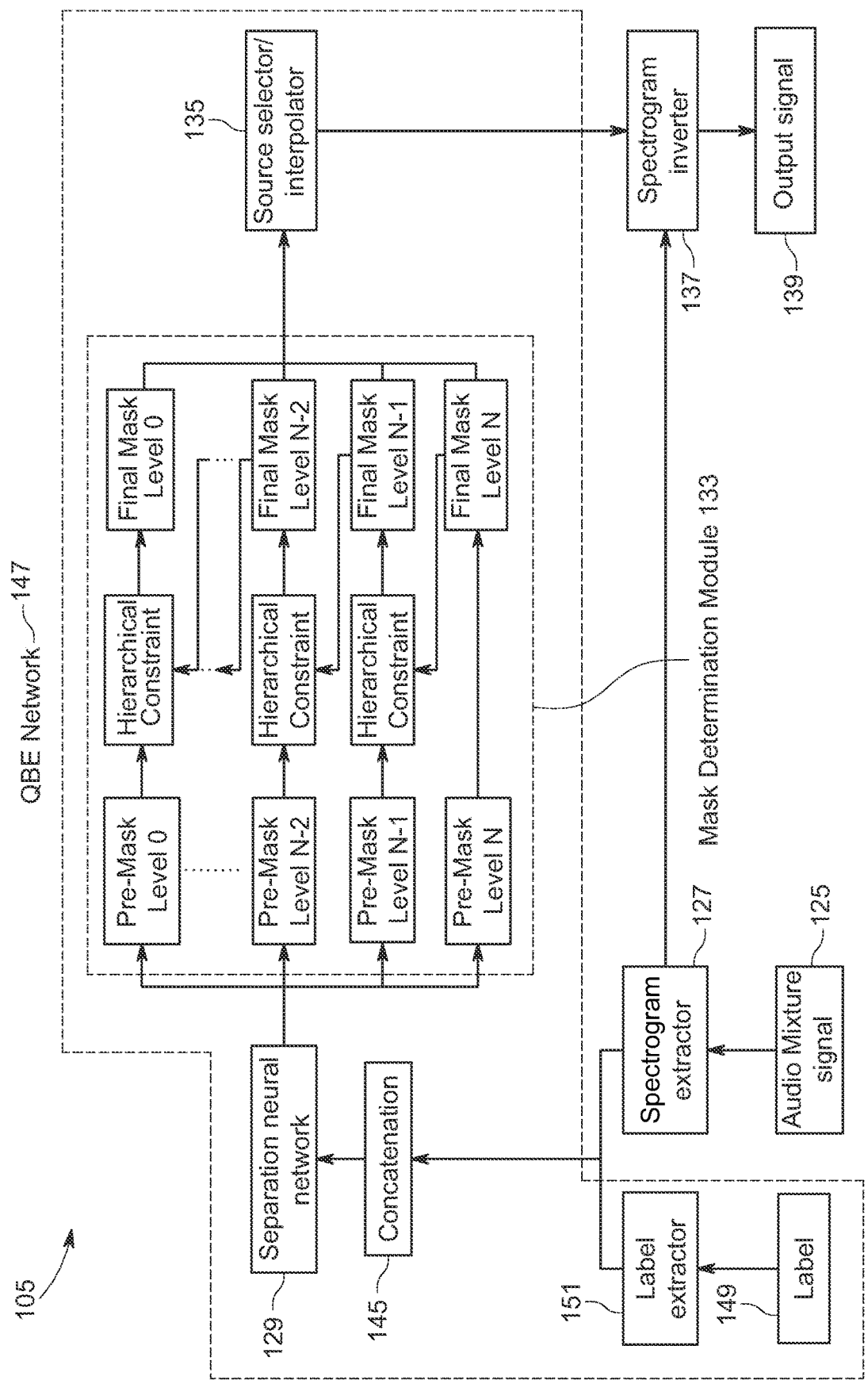
FIG. 1H is a schematic diagram illustrating different components of the neural network trained for query by example (QBE) separation, where the query is provided as an input label, in accordance with an example embodiment.
Figure 1I:
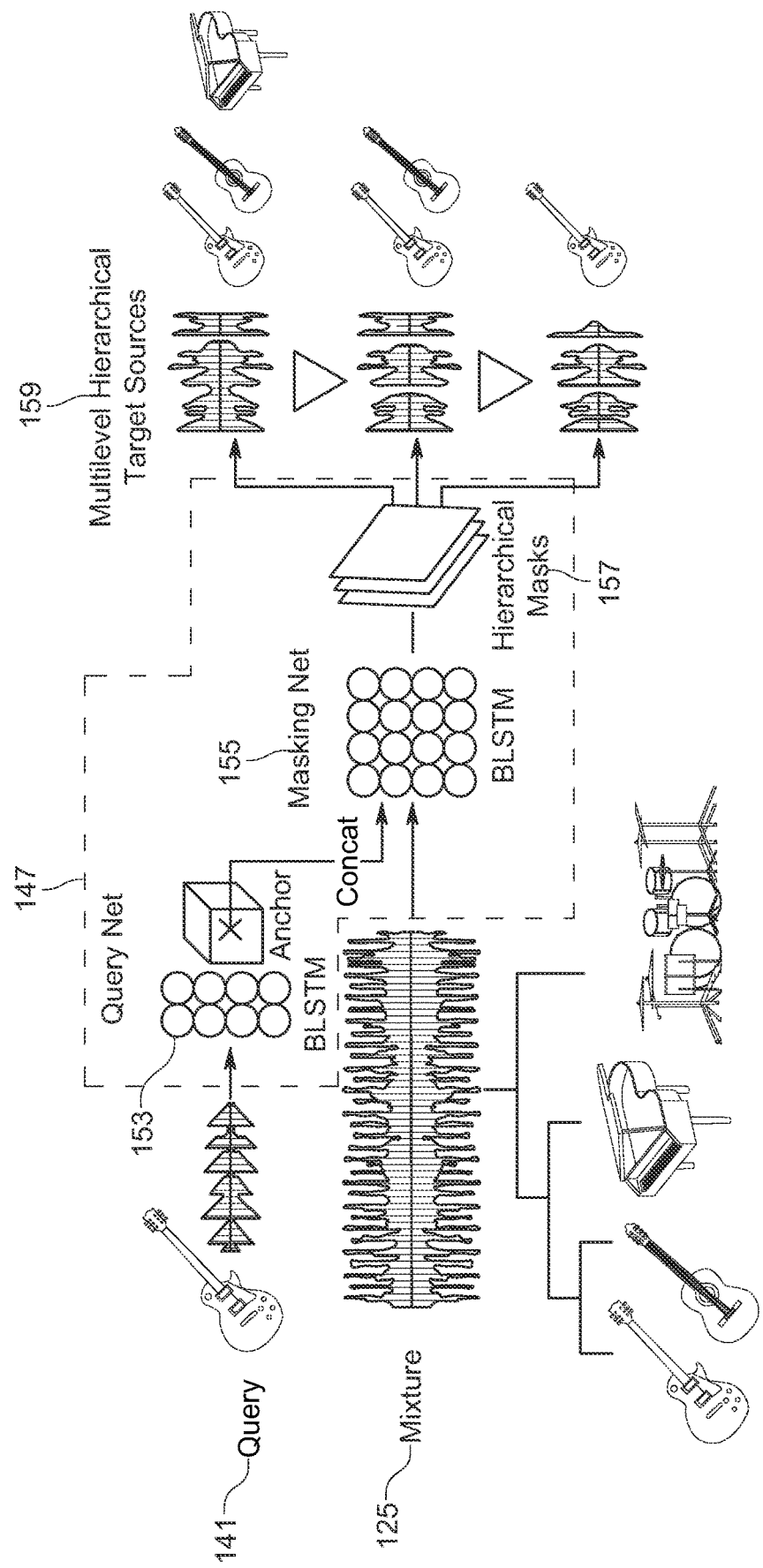
FIG. 1I illustrates extraction of multiple musical instruments and mutual relationship between the extracted multiple musical instruments, by the QBE network, in accordance with an example embodiment.

FIG. 1H is a schematic diagram illustrating different components of the neural network 105 trained for query by example (QBE) separation, where the query is provided as an input label 149, in accordance with an example embodiment. The QBE network 147 obtains an input audio mixture signal 125 and a query in the form of an input label 149. The input label 149 may be a text indicating a target audio source to be separated from the input audio mixture 125. In another embodiment, the input label 149 may be speech signal, where the speech signal may correspond to the target audio source to be separated from the input audio mixture 125.

The input audio mixture signal 125 is provided to a spectrogram extractor module 127, where a complex spectrogram of the input audio mixture signal 125 may be determined. Further, the input label 149 is provided to the label extractor 151, where the label extractor 151 processes the input label 149 and determines an anchor node corresponding to the input label 149. In an example embodiment, anchor nodes for different audio sources may be predefined and stored in the memory. Thus, on reception of the input label 149, the label extractor 151 may extracts the anchor node corresponding to the input label 149. The anchor node is a vector used for the QBE network 147, to encode the information in the input label 149 in a compact way. Further, the anchor node (or anchor vector) and the complex spectrogram of the input audio mixture signal 125 is provided to a concatenation module 145, where the anchor node is concatenated with each frame of the input audio mixture signal spectrogram and is provided to a separation neural network 129 to dynamically extract the sound sources from the input audio mixture signal 125 most similar to the input label 149 that has been provided to the system 101. The separation neural network 129 produces outputs representing masks of audio sources most similar to the input label 149 in the parent-children hierarchy 111. The separation neural network 129 is similar to the separation neural network used for SSS models in FIG. 1G.

FIG. 1I illustrates extraction of multiple musical instruments and mutual relationship between the extracted multiple musical instruments, by the QBE network 147, in accordance with an example embodiment. In some embodiments, the QBE network 147 obtains the input query audio 141 and the input audio mixture 125. It is assumed that the input audio mixture signal 125 contains a hierarchy of musical instruments (bottom left), and use the query audio 141 to separate instruments at multiple levels of the hierarchy 159, with the closest target at the lowest level (e.g., guitar). Based on the input query audio 141, the query network 147 generates an anchor node. The query network 147 is composed of 2 bidirectional long short-term memory (BLSTM) layers with 600 nodes in each direction and dropout of 0.3, followed by a fully-connected layer with linear activation that maps each time-frequency bin to an embedding space with 20 dimensions. Further, the anchor node and the input audio mixture signal 125 are concatenated and provided to a masking network 155.

The masking network 155 is the same as the SSS models, with a larger input feature vector to accommodate the concatenated query anchor. The masking network 155 is composed of composed of 4 bidirectional long short-term memory (BLSTM) layers with 600 hidden units in each direction and dropout of 0.3, followed by a fully connected layer with sigmoid activation function that outputs a mask. The masking network 155 generates multiple hierarchical masks 157. The hierarchical masks 157 may be multiplied with a spectrogram of the input audio mixture 125 to extract the multiple musical instruments and the mutual relationship between the musical extracted instruments as shown by the multilevel hierarchical target sources 159.

Figure 2A:
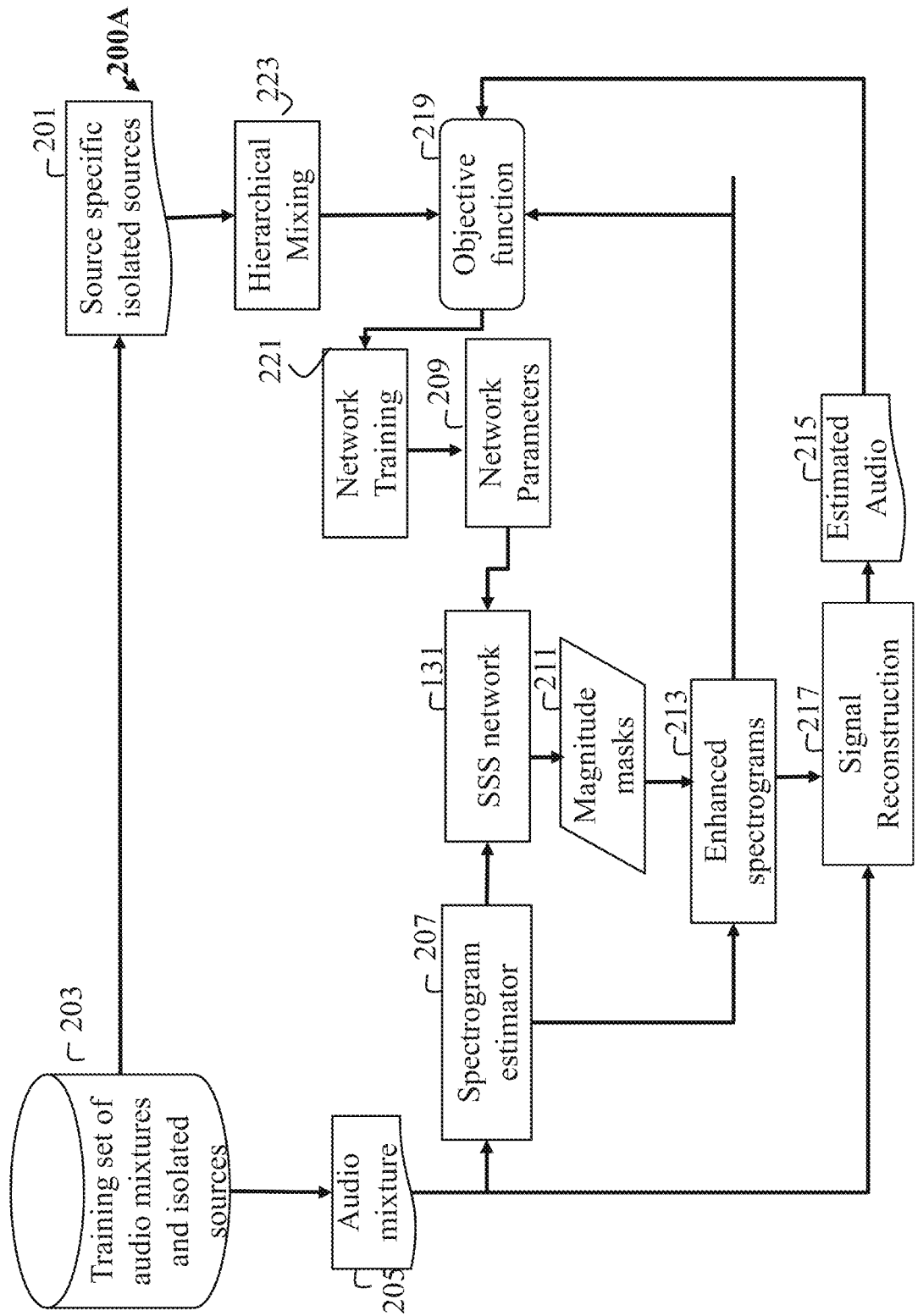
FIG. 2A is a flow diagram illustrating training of the audio processing system for extracting multiple source-specific audio sources from the input audio mixture signal, in accordance with an example embodiment of the present disclosure.

FIG. 2A is a flow diagram illustrating training of the audio processing system 200A for extracting multiple source-specific audio sources from the input audio mixture signal, in accordance with an example embodiment. The system 101 illustrates a general source separation scenario, in which the system 101 estimates multiple target audio signals from a mixture of target audio signals and potentially other non-target sources such as noise. The input audio mixture signal 205 includes the sum of multiple overlapping sources and is sampled from a training set 203 containing an acoustic mixture signal and the corresponding isolated sources that compose the mixture 205. The source specific isolated sources 201, are the isolated source signals corresponding to the relevant hierarchical categories (e.g., guitar) for which the SSS network 131 is trained.

The input audio mixture signal 205 is processed by a spectrogram estimator 207 to compute a time-frequency representation of the acoustic mixture. The spectrogram is then input to the SSS network 131, using stored network parameters 209. The SSS network 131 makes a decision as to the presence of each relevant source class in the hierarchy at each time frequency bin of the spectrogram, and estimates a set of magnitude masks 211. There is one magnitude mask for each source in the relevant path of the hierarchy, and the set of enhanced spectrograms 213 is computed by multiplying each mask with the complex time-frequency representation of the input audio mixture 205. The set of estimated audio signal waveforms 215 are obtained by passing each of the enhanced spectrograms 213 through the signal reconstruction process 217 that inverts the time-frequency representation computed by the spectrogram estimator 207.

The enhanced spectrograms 213 are then passed to an objective function 219 that can be used by a network training module 221 to update the network parameters 209. The network parameters are updated by comparing the enhanced spectrograms 213 with the target sources using the tPSA objective in equation (3), and using a stochastic gradient-based update rule such as the ADAM algorithm. The target sources are obtained from the source specific isolated sources 201 after passing through the hierarchical mixing module 223. The hierarchical mixing module 223 combines isolated audio sources from child nodes in the hierarchy together to make a target audio signal corresponding to the parent audio sources. For example, combining the isolated acoustic guitar and electric guitar audio signals to create an all guitars audio signal (parent), and then further combining this all guitars audio signal with the piano audio signal to create a mid-range stringed instrument audio signal (grandparent).

Figure 2B:
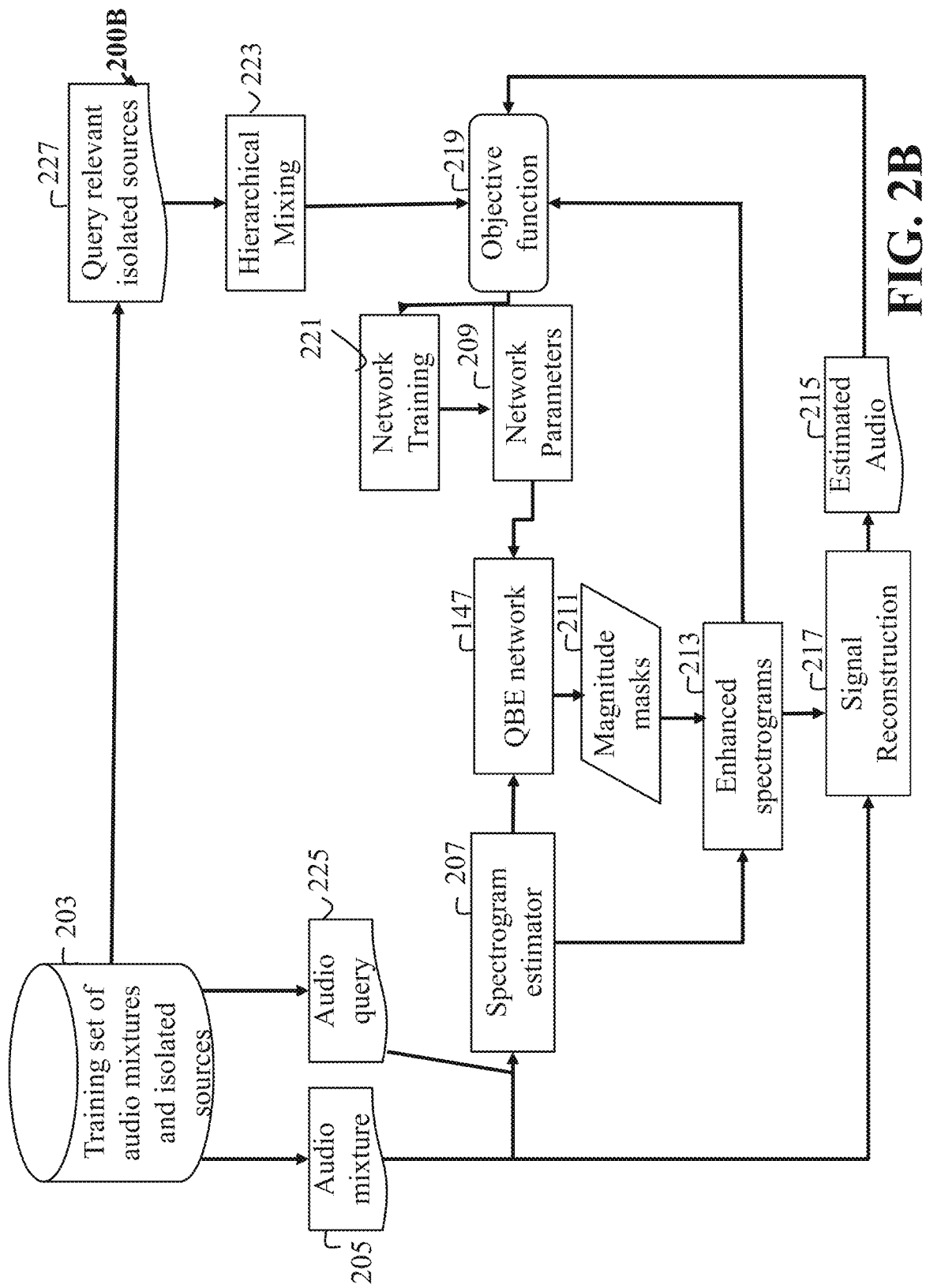
FIG. 2B is a flow diagram illustrating training of the audio processing system for extracting multiple audio sources from the input audio mixture signal, where the sources to be extracted are based on the content of a second query audio signal, i.e., query by example (QBE), in accordance with an example embodiment of the present disclosure.

FIG. 2B is a flow diagram illustrating training of the audio processing system 200B for extracting multiple audio sources from the input audio mixture signal, where the sources to be extracted are based on the content of a second query audio signal, i.e., query by example (QBE), in accordance with an example embodiment of the present disclosure. This training procedure is similar to the SSS case in FIG. 2A, however, from the training set of audio mixtures and isolated sources 203 we sample not only an audio mixture signal and the audio signals of the isolated sources composing the mixture, but also an audio query 225 corresponding to an isolated source signal that is not one of source signals composing the audio mixture 205. In an alternative embodiment, the audio query can be replaced with a class label. The spectrogram estimator 207 computes a time-frequency representation for both the acoustic mixture and the acoustic query.

The QBE network 147 then uses the spectrograms from both the acoustic mixture and the query to make a decision as to the presence of each relevant source class in the hierarchy at each time frequency bin of the spectrogram, and estimates a set of magnitude masks 211. There is one magnitude mask for each source in the query determined relevant path of the hierarchy, and the set of enhanced spectrograms 213 is computed by multiplying each mask with the complex time-frequency representation of the input audio mixture 205. The objective function 219 compares the set of enhanced spectrograms 213, with target sources obtained from the hierarchical mixing module 223 using query relevant isolated sources 227.

Figure 3:
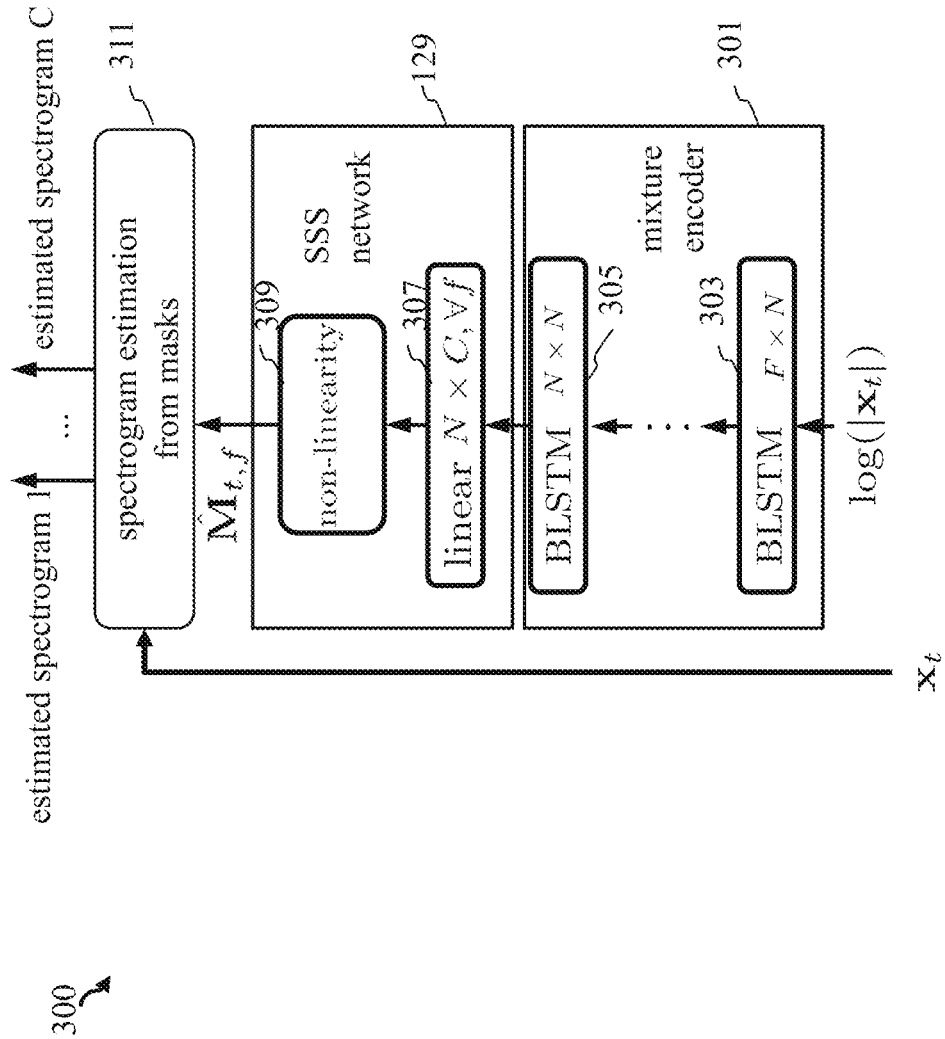
FIG. 3 is a block diagram illustrating a single-channel mask inference network architecture, in accordance with an example embodiment of the present disclosure.

FIG. 3 is a block diagram illustrating a single-channel mask inference network architecture 300, in accordance with an example embodiment of the present disclosure. A sequence of feature vectors obtained from the input audio mixture signal 205, for example the log magnitude of the short-time Fourier transform of the input audio mixture signal 205, is used as input to a mixture encoder 301. For example, the dimension of the input vector in the sequence can be F. The mixture encoder 301 is composed of multiple bidirectional long short-term memory (BLSTM) neural network layers, from the first BLSTM layer 303 to the last BLSTM layer 305. Each BLSTM layer is composed of a forward long short-term memory (LSTM) layer and a backward LSTM layer, whose outputs are combined and use as input by the next layer. For example, the dimension of the output of each LSTM in the first BLSTM layer 303 can be N, and both the input and output dimensions of each LSTM in all other BLSTM layers including the last BLSTM layer 305 can be N. The output of the last BLSTM layer 305 is used as input to the SSS network 131, including a linear neural network layer 307 and a non-linearity 309. For each time frame and each frequency in a time-frequency domain, for example the short-time Fourier transform domain, the linear layer 307 uses output of the last BLSTM layer 305 to output C numbers, where C is the number of target sources to be separated. The non-linearity 309 is applied to this set of C numbers for each time frame and each frequency, leading to mask values which indicate, for each time frame, each frequency, and each target source, the dominance of that target source in the input audio mixture signal 205 at that time frame and that frequency. A separation encoding estimation from masks module 311 uses these masks, together with a representation of the input mixture in the time-frequency domain for which the masks were estimated, for example the magnitude short-time Fourier transform domain, to output separation encodings for each target source. For example, the separation encoding estimation from masks module 311 can multiply the mask for a target source with the complex short-time Fourier transform of the input mixture to obtain an estimate of the complex short-time Fourier transform of the separated signal for that target source as if it had been observed in isolation.

Training:

In an example embodiment, to train the audio processing system 101 to extract multiple audio sources (musical instruments) from an audio mixture of multiple musical instruments and further to determine the mutual relationship between the extracted multiple audio sources, it is required to train the audio processing system 101 with a large dataset with isolated sources of many instruments that could be combined in a hierarchical way. The dataset should comprise a wide variety of granular source labels, i.e., not only "guitars", but "acoustic guitars", "electric guitars", "effected guitars", and so on for every instrument in the dataset.

In some embodiments, a Slakh2100 dataset is used to train the audio processing system 101. The Slakh2100 dataset comprises 2100 musical mixtures along with isolated sources. This dataset has 145 hours of mixture data split into 34 instrument categories. Further, in order to enable the neural network 105 to learn hierarchy from Slakh2100 dataset, the Slakh2100 dataset is further modified to include a musical instrument hierarchy from the Slakh's included instrument categories. The hierarchy may be defined with three levels (excluding the trivial level consisting of the mixtures of all sources). The top level contains four categories: mid-range strings and keys (guitars, keyboards, and orchestral strings), bass instruments (acoustic and electric basses), winds (flutes, reeds, and brass), and percussion (drum sets and chromatic percussion). The middle level has seven categories (e.g., from mid-range strings: orchestral strings, guitars, keyboards, and electric keyboards), and the lowest level has eighteen categories (e.g., from guitars: clean guitars, and effected guitars).

Further, in order to select example from the dataset, multiple instantaneous submixes for each track, corresponding to the different levels of the hierarchy may be created as illustrated in FIG. 4A.

FIG. 4A shows Table 1 that illustrates contents of hierarchical levels used for training and testing the hierarchical single-instrument source-specific separation (SSS) networks, in accordance with an example embodiment. At the highest level, all pianos, guitars, and strings are considered one source, while at the next level all guitars are considered one source, and at the lowest level only clean guitars are considered one source. For each mixture in the dataset, the saliency of each hierarchical submix in 10 second chunks, with a hop size of 2.5 seconds is computed. If the source in the submix has energy above −30 dB in that chunk, it is considered salient. For the experiments involving multiple levels, it may be ensured that for a given node, its parent source node (or grandparent) has energy from child source nodes other than itself. In other words, it is ensured that a parent source node is not exactly the same as the child source node, meaning that some of the child source node's siblings or cousins are also salient.

In an example embodiment, the Slakh200-split2 stratification is used and the audio is down sampled at 16 kHz. The mixing of audio sources (here musical instruments) to generate audio mixture is done on the fly and chunks are selected randomly from the pool of salient examples for the specific experiment. For training, the neural network 105 utilizes 20,000 examples per epoch (≈55.5 h), and further, 3,000 examples (≈8.3 h) are used for the validation and test sets. In order to ensure that for the SSS network 131 enough examples are used for training and that a rich enough hierarchy has been used to train, audio sources are separated down a path of the parent-children hierarchy 111 as shown in Table 1. In another embodiment, the proposed methods can be extended to other paths down other hierarchies. Further, for the QBE network 147, every instrument type in the parent-children hierarchy 111 may be separated. Query audio chunks are selected from the pool of salient chunks such that they are always leaf nodes along the same path as the target regardless of the target level, but originate from different tracks. Further, in order to determine the output quality of our models, the scale-invariant source-to-distortion ratio (SI-SDR) is used. For reference, the SI-SDR is reported when no processing is done on the mixes.

In an example embodiment, four types of hierarchical source separation models may be evaluated. The source separation models are varied along two dimensions: whether they are single-instrument (i.e., source-specific separation, or SSS) or multi-instrument (i.e., query-by-example, or QBE), and whether they output a single level, or multiple levels. Each configuration is described below:

Single-instrument, Single-level: A trio of instrument specific SSS models each corresponding to one level of the hierarchy along one hierarchical path.

Single-instrument, Multi-level: One SSS model that outputs a hierarchical set of masks, separating at all levels of a single hierarchical path simultaneously.

Multi-instrument, Single-level: A trio of multi-instrument QBE models outputting one mask at one level of the hierarchy as determined by an input query audio.

Multi-instrument, Multi-level: One QBE model that outputs a hierarchical set of masks for every level of the hierarchy along a path determined by an input query.

For the single-instrument models, the audio sources are separated along one path of the hierarchy as referenced in Table 1. The multi-instrument, multi-level model is trained to separate a source based on a query, and thus can learn the full hierarchy (i.e., all instruments) instead of just one path as in the single-instrument, multi-level case. For the multi-level models, the effect of the constraints is tested. Further, how well the multi-level models learn with limited data about the leaf source is also tested. To do this, the three-level SSS 131 and QBE 147 models are trained under the assumption that the leaf ground truth is unavailable either 50% or 90% of the time, in which cases only the upper levels are directly involved in the objective function. For comparison, models where all nodes are missing either 50% or 90% of the time during training are evaluated. These experiments can tell how well the multilevel network can leverage higher (i.e., coarser) levels of the parent-children hierarchy 111 at the leaf node. Such ability would be particularly advantageous as it is typically more difficult to collect data with fine-grained ground truth sources compared to data with a mixture and only a few source components gathered in broad categories.

All single-level and multi-level networks have the same architecture. The SSS models are composed of 4 bidirectional long short-term memory (BLSTM) layers with 600 hidden units in each direction and dropout of 0.3, followed by a fully connected layer with sigmoid activation function that outputs a mask. The QBE models are composed of two sub-networks, a query net and a masking net. The query net is composed of 2 BLSTM layers with 600 nodes in each direction and dropout of 0.3, followed by a fully-connected layer with linear activation that maps each time-frequency bin to an embedding space with 20 dimensions. The masking net is the same as the SSS models, with a larger input feature vector to accommodate the concatenated query anchor.

All models were trained with the Adam optimizer at a learning rate of 1e-4 for 100 epochs and a batch size of 25. The learning rate was halved if the loss on the validation set did not decrease for 5 straight epochs. The gradient was clipped to the 10th percentile of historical gradient norms if the norm of the minibatch was above that value.

Results:

FIG. 4B shows Table 2 that illustrates improvement in SI-SDR (dB) for hierarchical SSS (Guitar) and QBE models, in accordance with an example embodiment. Each model is trained either with the hierarchical constraint (HC) or with no constraints on the masks produced for sources at different levels of granularity. In table 2, the effect of the hierarchical constraint (HC) on multi-level hierarchical networks is examined. Further, it is observed that for the source-specific separation (SSS) network 131 (which in this case only separates guitars), the HC slightly diminishes performance at all levels, indicating that SSS models are able to learn the specific hierarchical relationship for a single source (in this case, guitar) at different levels without additional help. For the query-by-example (QBE) network 147 (which separates all types of instruments), the HC marginally hinders performance at Level 2, but helps considerably for the leaf node (Level 1). Further, it is hypothesized that QBE network 147 provides more benefits because the QBE network 147 is unable to learn the specific mask "shapes" of any individual source, and thus needs the additional help offered by the HC. Therefore, in all subsequent experiments the HC is included for QBE network 147, but omit it for the SSS network 131.

FIG. 4C shows Table 3 that illustrates non-hierarchical and hierarchical SSS and QBE model results in terms of SI-SDR (dB), in accordance with an example embodiment. In Table 3, Δ denotes improvement over the noisy mix. SSS network 131 is only trained to separate sources in the parent-children hierarchy 111 containing clean guitars (See Table 1), whereas QBE network 147 separate any source in the hierarchy. Here single-level networks (denoted by a "1") are compared to multi-level networks (denoted "3"). There is only one multi-level network for all three levels, but three single-level networks (one for each level). Table 3 expands on the results from Table 2 and results from single-level and multi-level hierarchical models for both SSS and QBE separation models are compared. In both cases, the multi-level hierarchical networks improve over the single-level models, with the largest gains occurring at lower hierarchy levels. This implies that the networks can leverage their shared knowledge of the hierarchy to aid themselves at the lower levels, where individual instruments are more difficult to discern in the mix.

From the Level 1 results in Table 3, it is observed that separating sources at this fine level of detail (e.g., clean electric guitars vs. distorted electric guitars) is extremely difficult, especially with a MIDI-synthesized data set such as Slakh2100, where several different instrument types may sound similar. In fact, when trying to train a single network to only separate these fine-grained sources, the single network fails as noted by the negative SI-SDR improvements in the #lvls=1 (single level) rows for Level 1 sources. Training networks on multiple levels simultaneously mitigates this to some extent, although it has been noticed that the multi-level network sometimes outputting nearly identical separated sources between Level 1 and Level 2. Further, the highest output SI-SDR values are obtained when separating Level 3 sources in Table 3. Therefore, separating sources at the more fine-grained Levels (1 and 2) is more difficult than what is typically attempted in musical source separation.

FIG. 4D shows Table 4 that illustrates SI-SDR improvement (dB) over the unprocessed audio mix ("Mix") for hierarchical SSS and QBE models (separated by the thick broken line), in accordance with an example embodiment. Each model is trained while removing either just the leaf ("leaf") or the whole example ("all") for a specified percentage of the data. Reducing just leaf nodes up to 90% shows only a 0.3 dB drop for SSS network 131 and 0.8 dB drop for QBE network 147 compared to using all of the leaves. Further, in Table 4 the effect of removing leaf sources (Level 1 sources, see Table 1 for guitar example) from the training set can be observed. Compared to reducing all of the data by 50% or 90%, the performance of reducing only the leaves degrades very minimally. In cases where the data is rich at higher levels but sparse data at lower levels, hierarchical multi-level networks can do a respectable job at separating lower levels. Similarly, for both SSS network 131 and QBE network 147 even a small amount of leaf data can help ward off a large drop in performance.

Thus, the present disclosure demonstrates the benefits of learning to simultaneously separate audio sources at different levels of granularity by re-framing the audio source separation problem as hierarchical.

Figure 5:
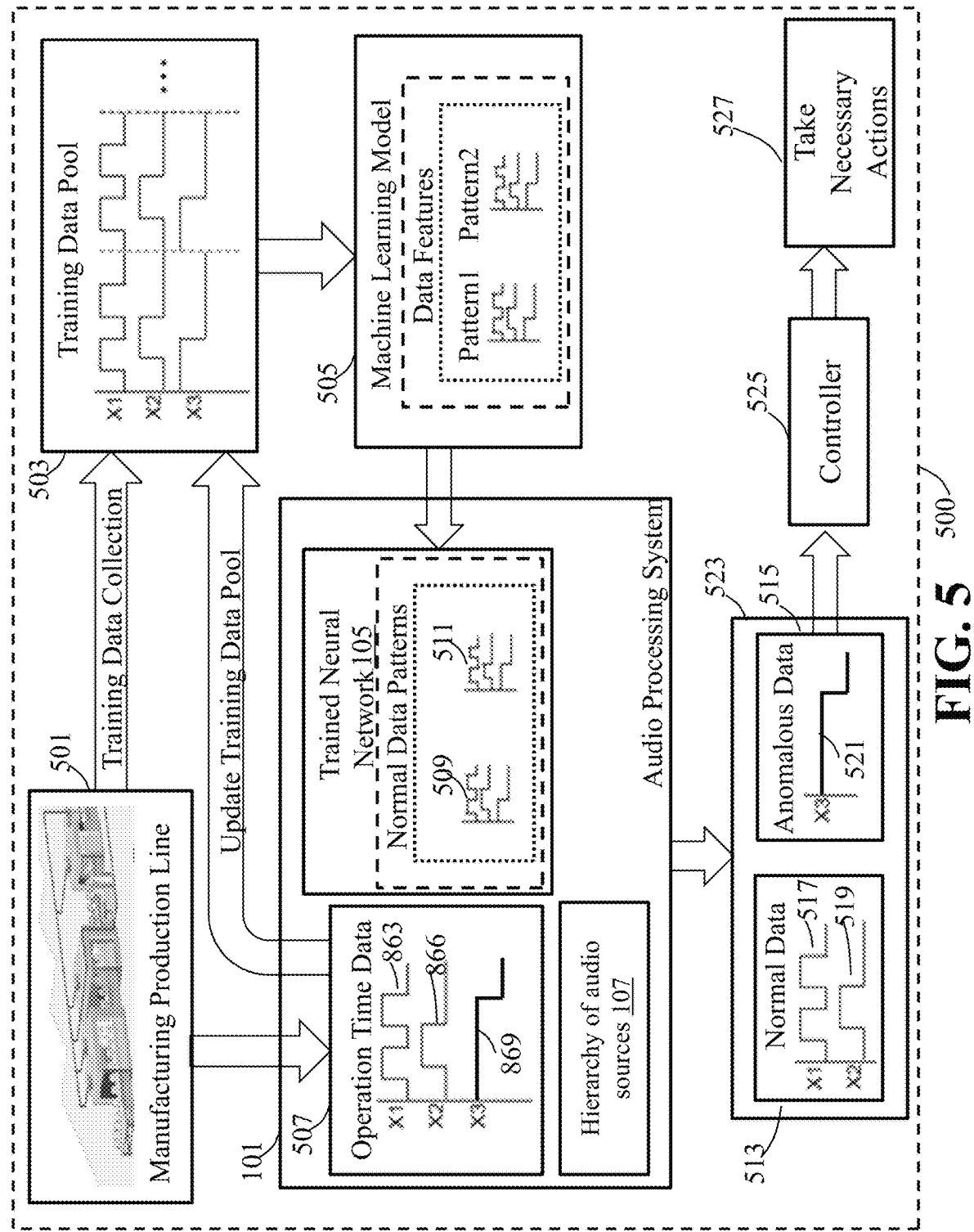
FIG. 5 illustrates anomaly detection by the audio processing system, in accordance with an example embodiment.

FIG. 5 illustrates anomaly detection by the audio processing system 101, in accordance with an example embodiment. In FIG. 5, there is shown a scenario 500 including a manufacturing production line 501, a training data pool 503, machine learning model 505 and the audio processing system 101. The manufacturing production line 501 comprises multiple components such as multiple engines which work together to manufacture products. Further, the production line 501 uses sensors to collect data. The sensor may be digital sensors, analog sensors, and combination thereof. The collected data serve two purposes, some data is stored in the training data pool 503 and used as training data to train the machine learning model 503 and some data is used as operation time data by the audio processing system 101 to detect anomaly. Same piece of data may be used by both the machine learning model 503 and the audio processing system 101.

To detect anomaly in the manufacturing production line 501, the training data is collected. The training data in training data pool 503 is used by the machine learning model 505 to train the neural network 105. The training data pool 503 can include either labeled data or unlabeled data. The labeled data is tagged with labels, e.g., anomalous or normal and the unlabeled data has no label. Based on a type of the training data, the machine learning model 505 applies different training approaches to detect anomaly. For the labeled training data, supervised learning is typically used and for the unlabeled training data, unsupervised learning is typically applied. In such a manner, different embodiments can handle different types of data. Further, detecting anomaly in the manufacturing production line 501 comprises detecting anomaly in each engine of the multiple engines comprised by the manufacturing production line 501.

The machine learning model 503 learns features and patterns of the training data, which include the normal data patterns and abnormal data patterns associated with audio sources. The audio processing system 101 uses the trained neural network 105 and the collected operation time data 507 to perform anomaly detection, where the operation time data 507 may comprise multiple audio source signals associated with the multiple engines. Further, the system 101 comprises a predetermined hierarchical relationship or order of different types of engines stored in hierarchy of audio sources 107. The hierarchical order of different types of engines is predefined in the hierarchy of audio sources 107 and the hierarchical order may be determined based on different audio properties of the engines (for example, based on range of frequencies in a sound produced by a particular engine, or the like).

On reception of the operation time data 507, the system 101 uses the neural network 105, where the neural network 105 is configured to subject the operation time data 507 to hierarchical constraints enforcing a parent-children hierarchy on different audio sources comprised by the operation time data 507, such that a parent audio source in the parent-children hierarchy is a mixture of its one or multiple children audio sources. The audio processing may extract different audio sources from the operation time data 507 and mutual relationship of the extracted audio sources according to the parent-children hierarchy. The separation of sounds of engines in a hierarchical order provides to a relationship between different engines comprised by the manufacturing production line 501. This enables the user to analyze sound of each engine of the multiple engines consequently enabling the user to analyze the manufacturing production line 501 at a granular level.

Further, the output of the audio processing system 101 is provided to an anomaly detector 523, where the anomaly detector 523 is configured to detect anomaly based on the extracted audio sources and mutual relationships between the extracted audio sources. The anomaly detector 523 identifies the operation time data 507 as normal or abnormal. For example, using normal data patterns 509 and 511, the trained neural network 105 may classify operation time data into normal data 513 and abnormal data 515. For example, operation time data X1 517 and X2 519 are classified as normal and operation time data X3 521 is classified as anomalous. Once anomaly is detected, a controller 525 may be used to take necessary actions 527 based on the detected anomaly.

Figure 6A:
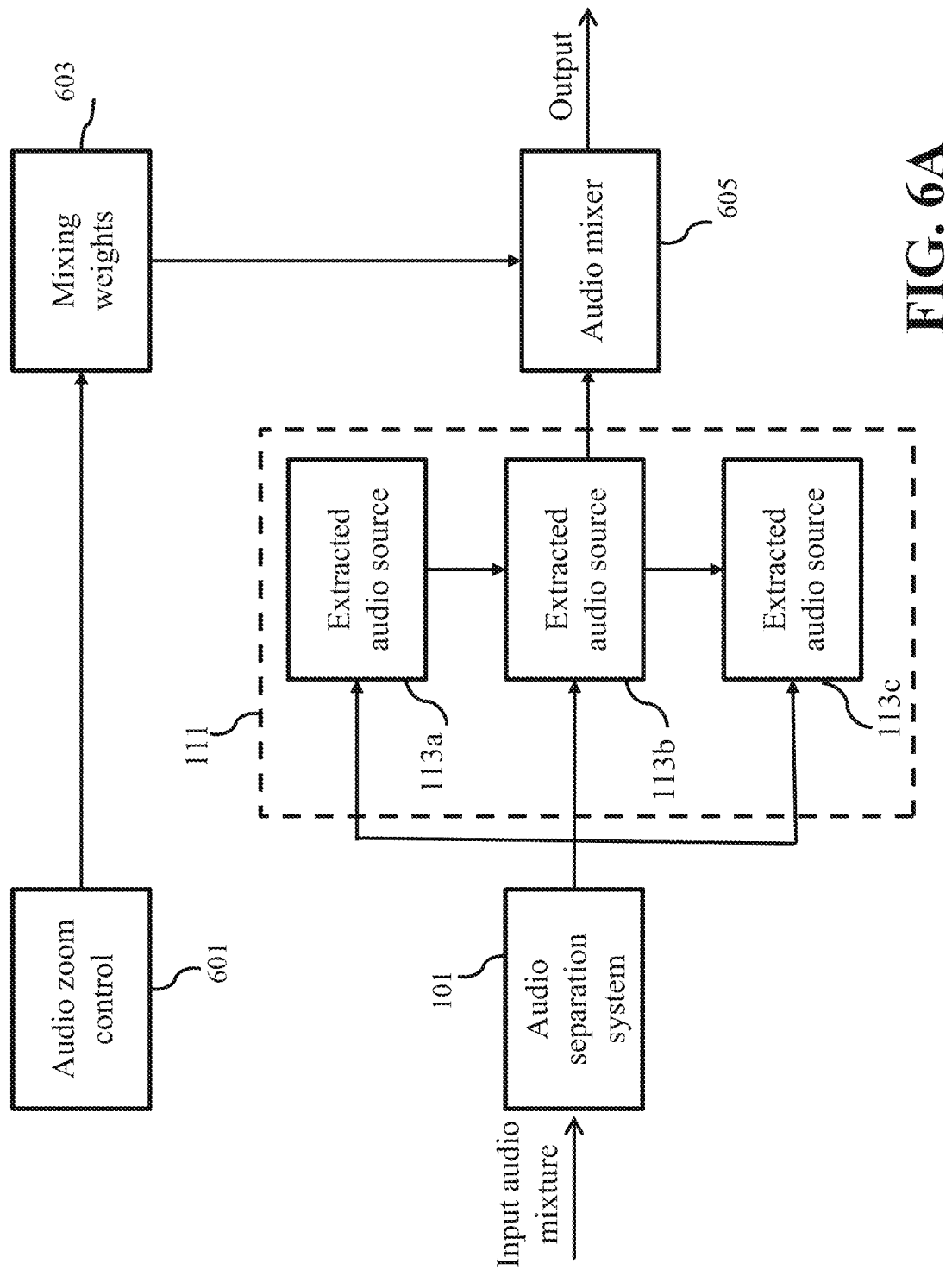
FIG. 6A illustrates hierarchical audio separation utilized in audio zooming application, in accordance with an example embodiment.

FIG. 6A illustrates hierarchical audio separation utilized in audio zooming application, in accordance with an example embodiment. The audio zooming application allows focusing more on one particular sound source while varying the level of surrounding context from the audio mixture using the hierarchical structure of sound sources. For example, the audio separation system 101 receives a song as an input that comprises sound of a singer and different musical instruments such as guitars, drums, pianos, cello, and violin. On reception of the song, the audio separation system 101 may extract ontology of different sounds from a predetermined hierarchical order (e.g., the parent-children hierarchy 111).

In this example the most specific extracted audio source 113c is a guitar, its parent 113b contains all mid-range string instruments, i.e., guitars pianos, and violins, and the grandparent 113a contains all sources in the entire song. The hierarchical separation of sounds allows the user to use an audio zoom control 601 and focus more on the sound from the selected instrument (e.g. guitar), zoom out to also hear sounds from similar instruments (i.e., the next level-up in the hierarchy, mid-range stringed instruments in this example), or zoom out further to hear the original audio mixture. Based on the setting of the user zoom control 601, a set of mixing weights 603 are generated and fed to an audio mixer 605 that combines each of the extracted audio sources from the hierarchy 111 using the mixing weights 603, to generate the output signal for listening.

Figure 6B:
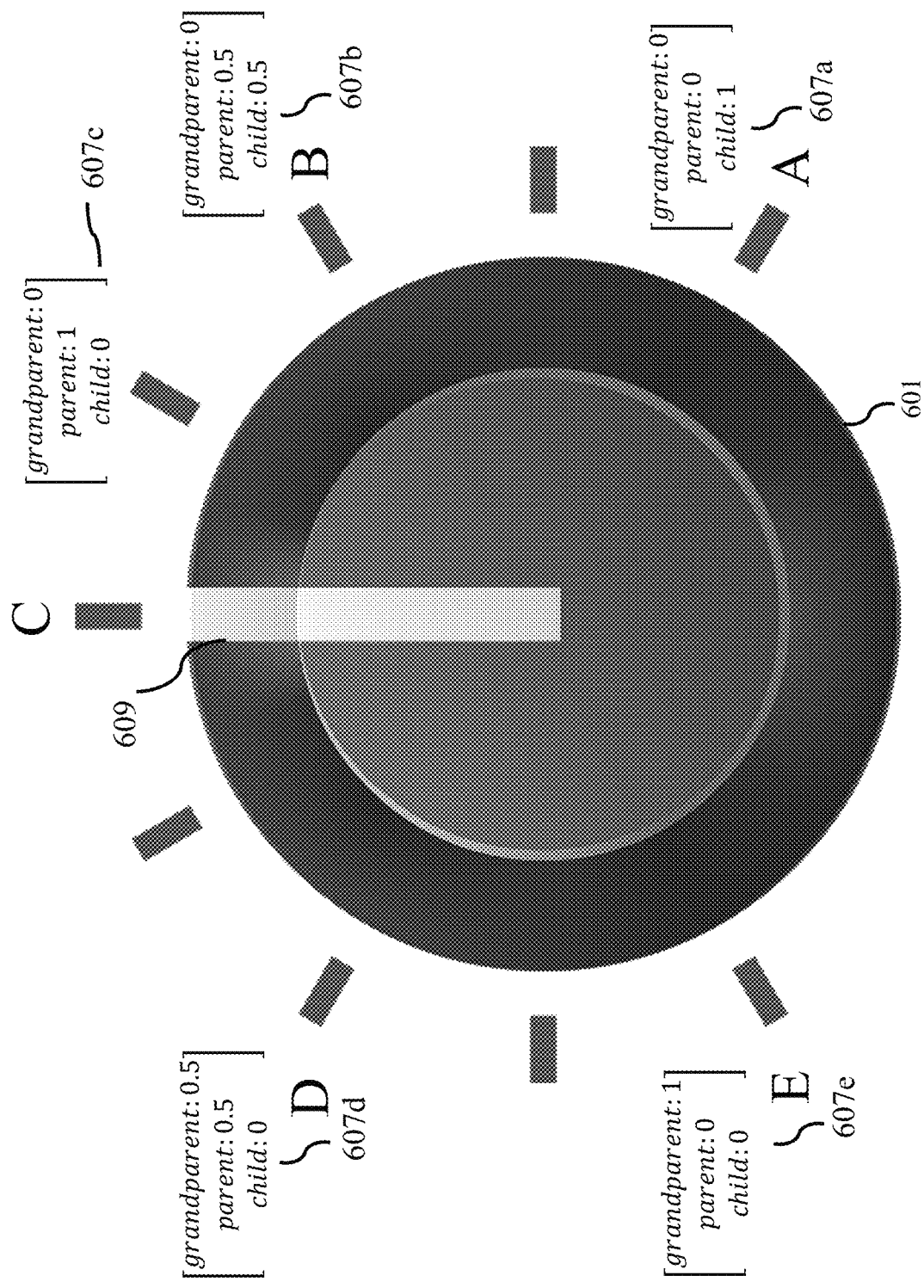
FIG. 6B illustrates a zoom control knob 601, where the position of the zoom control knob 601 is translated to mixing weights for audio zooming, in accordance with an example embodiment, in accordance with an example embodiment.

FIG. 6B illustrates a zoom control knob 601, where the position of the zoom control knob 601 is translated to mixing weights for audio zooming, in accordance with an example embodiment. The zoom control knob 601 comprises an indicator of ratios 609 that indicates weights used for mixing different audio sources extracted from the input audio mixture at that particular level, where the audio sources are extracted by using the audio processing system 101. For example, when the knob is set at position A mixing weights are adjusted such that only the child source (e.g., guitar) will be output by the audio mixer, as illustrated by the mixing weights 607a. In this case, weight is assigned to only a child audio source whereas no weights are assigned to the grandparent and parent audio sources. Similarly, at position B the mixing weights 607b are a mixture of the child source (e.g., guitar) with the parent source (e.g., mid-range string instruments). The midpoint position C outputs only the parent source 607c, while position D 607d interpolates between the parent and grandparent sources, and position E 607e outputs only the grandparent source (e.g., the original audio mixture). In this way, the audio processing system 101 outputs the extracted audio sources in proportion to the indicated ratios at specific levels.

Exemplar Implementations

Figure 7:
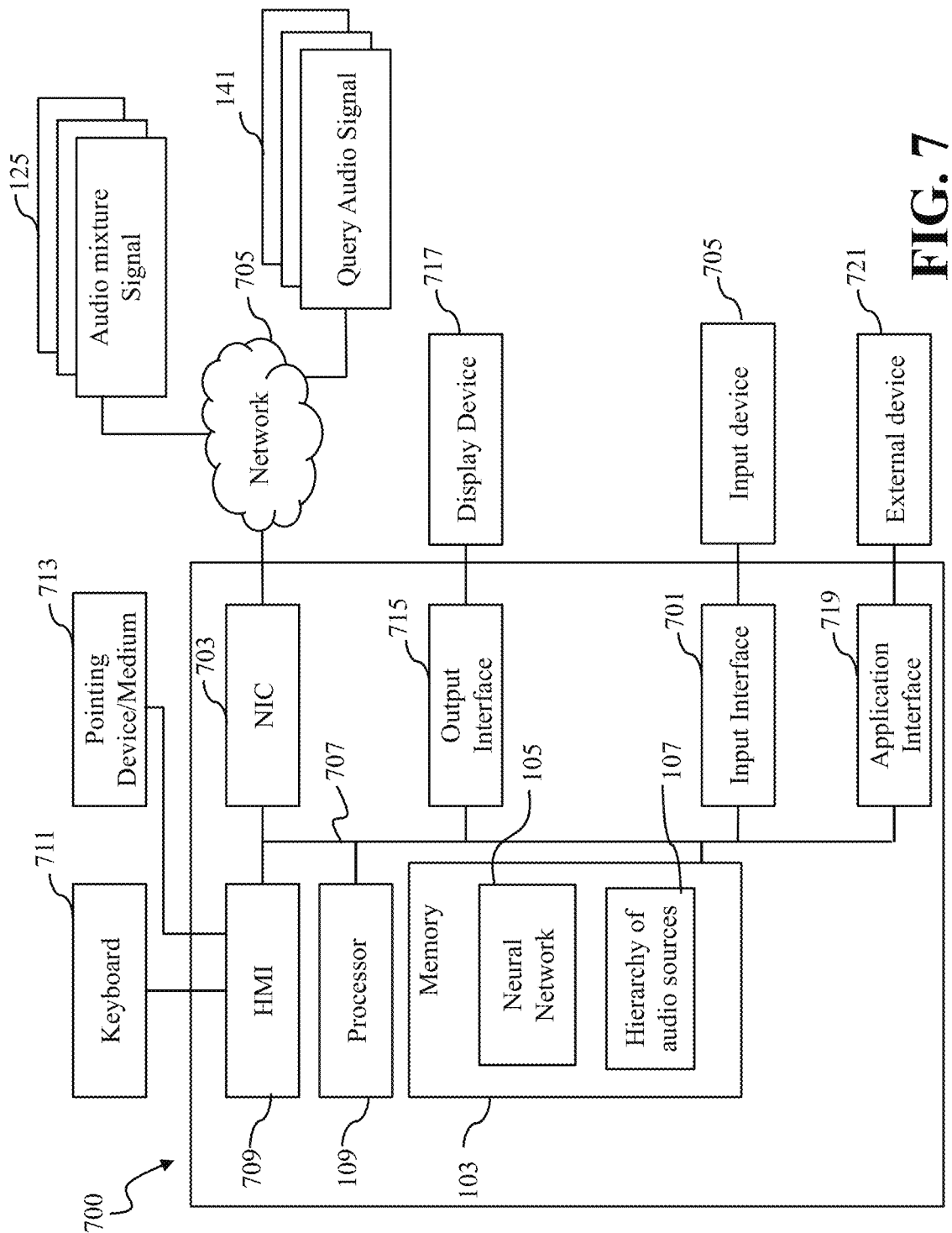
FIG. 7 illustrates a block diagram of a computer-based audio processing system, in accordance to some embodiments.

FIG. 7 illustrates a block diagram of a computer-based audio processing system 700, in accordance to some embodiments. The computer-based audio processing system 700 includes a number of interfaces connecting the system 700 with other systems and devices. The system 700 includes an input interface 701 configured to accept input audio mixture signal 125 and input query audio signal 141. The input device 705 can be a microphone. Additionally, or alternatively, the computer-based audio processing system 700 can receive the input audio mixture signal 125 and input query audio signal 141 from various other types of input interfaces. In some embodiments, the system 700 includes an audio interface configured to obtain the input audio mixture signal 125 and input query audio signal 141 from the input device 705. In some other embodiments, the input interface 701 include a network interface controller (NIC) 703 configured to obtain the input audio mixture signal 125 and input query audio signal 141, via network 705, which can be one or combination of wired and wireless network.

The network interface controller (NIC) 703 is adapted to connect the system 700 through a bus 707 to the network 705 connecting the system 700 with sensing devices, for example, input device 705 such as the microphone. Additionally, or alternatively, the system 700 can include a human machine interface (HMI) 709. The human machine interface 709 within the system 700 connects the system 700 to a keyboard 711 and a pointing device/medium 713, wherein the pointing device/medium 713 can include a mouse, trackball, touchpad, joy stick, pointing stick, stylus, or touchscreen, among others.

The system 700 includes a processor 109 configured to execute instructions stored in a memory 103. The processor 109 can be a single core processor, a multi-core processor, a computing cluster, or any number of other configurations. The memory 103 can include random access memory (RAM), read only memory (ROM), flash memory, or any other suitable memory systems. The processor 109 can be connected through the bus 707 to one or more input and output devices.

The instructions can implement a method for audio processing where the method extracts multiple audio sources from the input audio mixture signal 125 based on the input query audio 141. The extracted multiple audio sources produce a sound similar to the input query audio 141. To that end, the computer memory 103 stores the neural network 105 trained to extract, from the input audio mixture, multiple audio sources comprised by the input audio mixture 125. The extracted multiple audio sources are subjected to hierarchical constraints of audio properties that enforce a parent-children hierarchy 111 of the extracted multiple audio sources. The parent-children hierarchy 111 of the extracted multiple audio is determined based on a hierarchy of audio sources 107, where the hierarchy of audio sources 107 is predetermined and comprises a set of all possible audio sources that are associated with the input audio mixture and a mutual relationship between the audio sources in the set.

The audio processing system 700 includes an output interface 715 configured to render at least a portion of the extracted multiple audio sources. In another embodiment, the output interface outputs a notification when the neural network 105 determines that there is no audio source similar to the input query audio 141 present in the hierarchy of audio sources 107. The notification may be a message that is displayed on a display device 717. In another embodiment, the user may be notified by generating a buzzer sound. In some other embodiment, the audio processing system 700 may output no audio to indicate silence, where such silence corresponds to the indication of no audio source similar to the input query audio 141.

Examples of the display device 717 include a computer monitor, television, projector, or mobile device, among others. The system 700 can also be connected to an application interface 719 adapted to connect the system 700 to an external device 721 for performing various tasks.

Figure 8:
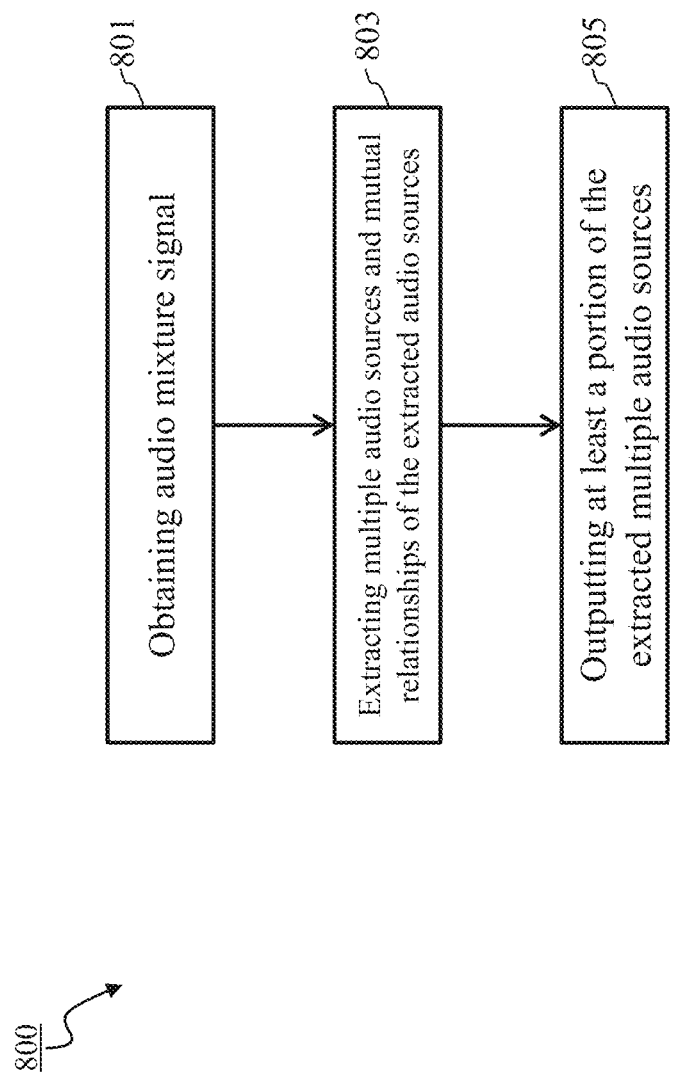
FIG. 8 illustrates steps of a method implemented for extracting multiple audio sources from an input audio mixture, in accordance with an example embodiment.

FIG. 8 illustrates steps of a method 800 implemented for extracting multiple audio sources from an input audio mixture, in accordance with an example embodiment. At step 801, audio mixture signal may be obtained. The input audio mixture comprises multiple audio signals from multiple different audio sources. For example, the input audio mixture may comprise sounds of multiple musical instruments such as guitar, piano, drums, or the likes. The input audio mixture signal may be provided to the neural network 105.

At step 803, multiple audio sources present in the input audio mixture may be extracted along with mutual relationships of the extracted audio sources, where the mutual relationship is based on a parent-children hierarchy (e.g., the parent-children hierarchy 111) of the multiple audio sources. To that end, the neural network 105 is trained to separate audio sources from an audio mixture subject to hierarchical constraints enforcing a parent-children hierarchy on the audio sources, such that a parent audio source in the parent-children hierarchy is a mixture of its one or multiple children audio sources. Thus, the neural network 105 extract, from the input audio mixture, multiple audio source signals comprised by the input audio mixture. The input audio mixture is subjected to hierarchical constraints that enforce the parent-children hierarchy of multiple audio sources corresponding to the extracted multiple audio source signals. Therefore, in response to receiving the input audio mixture at step 801, the neural network 105 extracts the multiple audio sources, and render at least a portion of the extracted multiple audio sources.

At step 805, at least a portion of the extracted multiple audio sources may be rendered. Then at least a portion of the extracted multiple audio sources may be used to analyze each and every extracted audio source to a greater details. It may be useful in determining an anomaly in the audio source itself.

Embodiments

The description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Further, embodiments of the present disclosure and the functional operations described in this specification can be implemented in digital electronic circuitry, in tangibly-embodied computer software or firmware, in computer hardware, including the structures disclosed in this specification and their structural equivalents, or in combinations of one or more of them. Further some embodiments of the present disclosure can be implemented as one or more computer programs, i.e., one or more modules of computer program instructions encoded on a tangible non transitory program carrier for execution by, or to control the operation of, data processing apparatus. Further still, program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

According to embodiments of the present disclosure the term "data processing apparatus" can encompass all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

The invention claimed is:

1. An audio processing system, comprising:
a memory configured to store a neural network trained to process an audio mixture to output estimation of at least a subset of a set of audio sources present in the audio mixture, wherein the audio sources are subject to hierarchical constraints enforcing a parent-children hierarchy on the set of audio sources, such that a parent audio source in the parent-children hierarchy includes a mixture of its one or multiple children audio sources, and wherein the subset includes at least one parent audio source and at least one of its children audio sources;
an input interface configured to receive an input audio mixture;
a processor configured to process the input audio mixture using the neural network to extract estimates of the subset of audio sources and their mutual relationships according to the parent-children hierarchy and interpolate different audio sources by mixing the children audio sources using different weights applied to different children audio sources; and
an output interface configured to render the extracted audio sources and their mutual relationships.

2. The audio processing system of claim 1, wherein the subset of audio sources corresponds to a path on the parent-children hierarchy of the set of audio sources starting at a root node till a leaf node.

3. The audio processing system of claim 1, wherein audio properties of the at least one extracted parent audio source include a union of audio properties of the extracted at least one children audio source, wherein audio properties of an audio source include one or combination of spectral characteristics, contextual information, tonal components, tone-to-noise ratio values, and cepstrum peak amplitudes.

4. The audio processing system of claim 1, wherein the processor is configured to
extract only children audio sources corresponding to leaf nodes of the parent-children hierarchy from the input audio mixture using the neural network;
extract one or multiple paths from the parent-children hierarchy associated with the extracted children audio sources; and
reconstruct at least one parent audio source of a parent node of the parent-children hierarchy by mixing the children audio sources according to the one or multiple paths of the parent-children hierarchy leading to the parent node.

5. The audio processing system of claim 1, wherein the input interface is configured to receive input data indicative of a target audio source, and wherein the processor is configured to extract, from the input audio mixture, the target audio source and parents of the target audio source according to the parent-children hierarchy.

6. The audio processing system of claim 5, wherein the input data include a label of a node in the parent-children hierarchy.

7. The audio processing system of claim 5, wherein the input data include a query audio signal, such that the neural network is trained to separate a child audio source closest to the query audio signal and parents of the child audio source according to the parent-children hierarchy.

8. The audio processing system of claim 1, wherein the processor is coupled with stored instructions implementing modules of the audio processing system, including:
a spectrogram extractor module configured to produce a spectrogram for a sequence of frames of the input audio mixture;
a mask determination module configured to form outputs of the neural network into a set of masks corresponding to the extracted audio sources at different levels of parent-children hierarchy, such that an application of a mask to the spectrogram extracts the corresponding audio source, wherein the hierarchical constraints enforce that masks at higher levels in the parent-children hierarchy apportion at least the same amount of energy as masks at lower levels in the parent-children hierarchy;
a source selector module configured to select masks in the set of masks according to a target output; and
a spectrogram inverter module configured to apply the selected masks to the spectrogram to extract the audio sources from the input audio mixture.

9. The audio processing system of claim 8, wherein the source selector module selects masks, formed by the mask determination module, corresponding to nodes on a single path in the parent-children hierarchy.

10. The audio processing system of claim 8, wherein the source selector interpolates at least two masks, such that the spectrogram inverter applies the interpolated mask to the spectrogram to extract the audio source.

11. The audio processing system of claim 8, wherein the modules of the audio processing system further include
a query extractor configured to process a query audio signal to obtain an anchor vector; and
a concatenation module configured to combine the anchor vector with each frame of the input audio mixture spectrogram, and wherein the neural network is configured to receive as an input the spectrogram combined with the anchor vector to produce outputs representing masks of audio sources most similar to the query audio signal in the parent-children hierarchy.

12. The audio processing system of claim 8, wherein the neural network is trained to output, simultaneously, masks for audio sources of different levels of the parent-children hierarchy subject to the hierarchical constraints while minimizing an objective function for each level of the parent-children hierarchy.

13. The audio processing system of claim 12, wherein the objective function is a truncated phase-sensitive approximation (tPSA) objective function.

14. An anomaly detection system for controlling a machine, comprising:
the audio processing system of claim 1 configured to:
receive the input audio mixture generated by components of a machine; and
extract multiple audio sources and mutual relationships of the extracted audio sources according to a parent-children hierarchy;
an anomaly detector configured to detect anomaly based on the extracted audio sources and mutual relationships between the extracted audio sources; and
a controller configured to control the machine based on the detected anomaly.

15. An audio zooming system, comprising:
the audio processing system of claim 1, and
an indicator of ratios for different levels of the parent-children hierarchy, wherein the audio processing system outputs the extracted audio sources in proportion to the indicated ratios at specific levels.

16. An audio processing method, wherein the method uses a processor coupled to a memory storing a neural network trained to process an audio mixture to output estimation of at least a subset of a set of audio sources present in the audio mixture, wherein the audio sources are subject to hierarchical constraints enforcing a parent-children hierarchy on the set of audio sources, such that a parent audio source in the parent-children hierarchy includes a mixture of its one or multiple children audio sources, and wherein the subset includes at least one parent audio source and at least one of its children audio source, wherein the processor is coupled with stored instructions implementing the method, wherein the instructions, when executed by the processor carry out steps of the method, comprising:
receiving an input audio mixture;
processing the input audio mixture using the neural network to extract estimates of the subset of audio sources and their mutual relationships according to the parent-children hierarchy;
extracting only children audio sources corresponding to leaf nodes of the parent-children hierarchy from the input audio mixture using the neural network; and
reconstructing at least one parent audio source of a parent node of the parent-children hierarchy by mixing the children audio sources according to one or multiple paths on the parent-children hierarchy leading to the parent node; and
rendering the extracted audio sources and their mutual relationships.

17. The audio processing method of claim 16, wherein the method further comprises:
receiving input data indicative of a target audio source, and
extracting, from the input audio mixture, the target audio source and parents of the target audio source according to the parent-children hierarchy.

18. The audio processing method of claim 17, wherein the input data include a label of a node on the parent-children hierarchy.

19. An audio processing system, comprising:
a memory configured to store a neural network trained to process an audio mixture to output estimation of at least a subset of a set of audio sources present in the audio mixture, wherein the audio sources are subject to hierarchical constraints enforcing a parent-children hierarchy on the set of audio sources, such that a parent audio source in the parent-children hierarchy includes a mixture of its one or multiple children audio sources, and wherein the subset includes at least one parent audio source and at least one of its children audio sources;
an input interface configured to receive an input audio mixture;
a processor configured to process the input audio mixture using the neural network to extract estimates of the subset of audio sources and their mutual relationships according to the parent-children hierarchy; and
an output interface configured to render the extracted audio sources and their mutual relationships, wherein the processor is coupled with stored instructions implementing modules of the audio processing system, including:
a spectrogram extractor module configured to produce a spectrogram for a sequence of frames of the input audio mixture;
a mask determination module configured to form outputs of the neural network into a set of masks corresponding to the extracted audio sources at different levels of parent-children hierarchy, such that an application of a mask to the spectrogram extracts the corresponding audio source, wherein the hierarchical constraints enforce that masks at higher levels in the parent-children hierarchy apportion at least the same amount of energy as masks at lower levels in the parent-children hierarchy;
a source selector module configured to select masks in the set of masks according to a target output; and
a spectrogram inverter module configured to apply the selected masks to the spectrogram to extract the audio sources from the input audio mixture.

20. An audio zooming system, comprising:
an audio processing system, comprising:
a memory configured to store a neural network trained to process an audio mixture to output estimation of at least a subset of a set of audio sources present in the audio mixture, wherein the audio sources are subject to hierarchical constraints enforcing a parent-children hierarchy on the set of audio sources, such that a parent audio source in the parent-children hierarchy includes a mixture of its one or multiple children audio sources, and wherein the subset includes at least one parent audio source and at least one of its children audio sources;
an input interface configured to receive an input audio mixture;
a processor configured to process the input audio mixture using the neural network to extract estimates of the subset of audio sources and their mutual relationships according to the parent-children hierarchy; and
an output interface configured to render the extracted audio sources and their mutual relationships; and
an indicator of ratios for different levels of the parent-children hierarchy, wherein the audio processing system outputs the extracted audio sources in proportion to the indicated ratios at specific levels.

* * * * *